United States Patent
Carrer et al.

(10) Patent No.: US 7,580,454 B2
(45) Date of Patent: Aug. 25, 2009

(54) MULTIDIMENSIONAL DECISION-DIRECTED TRAINED ADAPTIVE EQUALIZATION

(75) Inventors: Hugo Santiago Carrer, Córdoba (AR);
Diego Ernesto Crivelli, Córdoba (AR);
Mario Rafael Hueda, Córdoba (AR)

(73) Assignee: Fundacion Tarpuy (AR)

( * ) Notice: Subject to any disclaimer, the term of this patent is extended or adjusted under 35 U.S.C. 154(b) by 681 days.

(21) Appl. No.: 10/891,876

(22) Filed: Jul. 14, 2004

(65) Prior Publication Data
US 2006/0013296 A1    Jan. 19, 2006

(51) Int. Cl.
*H03H 7/30* (2006.01)
(52) U.S. Cl. ........................................ 375/233
(58) Field of Classification Search ........... 375/233
See application file for complete search history.

(56) References Cited

U.S. PATENT DOCUMENTS

| | | | | |
|---|---|---|---|---|
| 4,635,276 A | * | 1/1987 | Karabinis | ............... 375/235 |
| 5,388,088 A | | 2/1995 | Gans et al. | |
| 5,483,529 A | * | 1/1996 | Baggen et al. | ............... 370/484 |
| 5,838,740 A | * | 11/1998 | Kallman et al. | ............. 375/346 |
| 5,903,610 A | * | 5/1999 | Skold et al. | ................. 375/285 |
| 6,782,211 B1 | | 8/2004 | Core | |
| 6,963,619 B1 | * | 11/2005 | Gesbert et al. | ............... 375/267 |
| 2002/0186435 A1 | | 12/2002 | Shpantzer et al. | |
| 2004/0096143 A1 | | 5/2004 | Shpantzer et al. | |

OTHER PUBLICATIONS

Agazzi, O.E, et al., Max. likelihood sequence estimation in the presence of chromatic and polarization mode dispersion in intensity modulation/direct detection optical channels , Communications, Jun. 2004, pp. 2787-2793.
Black, Peter J., et al., A 1-Gb/s, Four-State, Sliding Block Viterbi Decoder, IEEE J. Solid-State Circuits, vol. 32, No. 6, Jun. 1997.
Tuchler, Michael, et al., "Turbo Equalization: Principles and New Results", IEEE Trans. on Communications, vol. 50, No. 5, May 2002.

* cited by examiner

*Primary Examiner*—Kevin Y Kim
(74) *Attorney, Agent, or Firm*—Blakely, Sokoloff, Taylor & Zafman LLP

(57) ABSTRACT

An embodiment of the invention is a technique to equalize received samples. An equalizer to equalize a multidimensional signal transmitted over a communication channel and having a dimensionality of four or higher. The equalizer is adaptively decision directed trained.

24 Claims, 15 Drawing Sheets

MULTIDIMENSIONAL DECISION-DIRECTED TRAINED ADAPTIVE EQUALIZATION

BACKGROUND

1. Field of the Invention

Embodiments of the invention relate to optical communication, and more specifically, to digital equalization for optical communication.

2. Description of Related Art

Several impairments may have severe impact on optical communication at data rates of 10 Gigabits/sec (Gb/s) and beyond. These impairments include chromatic dispersion (CD), polarization mode dispersion (PMD), and phase noise of the transmitter, the local oscillator and any other optical components in the optical system such as optical amplifiers.

Existing equalization techniques to compensate for these impairments are inadequate. Linear or decision feedback equalization (DFE) used in intensity modulation/direct detection (IM/DD) receivers has limited effectiveness in single-mode fibers due to the nonlinear behavior of these channels. Adaptation schemes in optical domain techniques are complicated because phase information of the error signal obtained from the electrical domain after direct detection is inherently eliminated. Electronic equalization techniques using microwave and millimeter wave technology are difficult to implement and are not adaptive, leading to poor performance.

BRIEF DESCRIPTION OF THE DRAWINGS

The invention may best be understood by referring to the following description and accompanying drawings that are used to illustrate embodiments of the invention. In the drawings.

DESCRIPTION

An embodiment of the invention is a technique to equalize received samples. A coefficient generator generates filter coefficients using a rotated error vector. A filter stage generates equalized samples or slicer input vector from received samples or rotated received samples using the filter coefficients. The received samples are provided by a receiver front end in an optical transmission channel carrying transmitted symbols.

Another embodiment of the invention is a technique to equalize received samples. An optical-to-electrical converter (OEC) produces an electrical signal vector representing at least one of amplitude, phase, and polarization information of a modulated optical carrier transmitted through an optical channel with impairments. A signal processor processes the electrical signal vector to compensate the impairments of the optical channel. The signal processor includes at least an adaptive equalizer to generate an equalized output, a decision, and an error. The error is difference between the equalized output and the decision. The adaptive equalizer has an adaptation based on at least the error.

Another embodiment of the invention is a technique to equalize received samples. An equalizer to equalize a multi-dimensional signal transmitted over a communication channel and having a dimensionality of four or higher. The equalizer is adaptively decision directed trained.

In the following description, numerous specific details are set forth. However, it is understood that embodiments of the invention may be practiced without these specific details. In other instances, well-known circuits, structures, and techniques have not been shown in order not to obscure the understanding of this description.

An embodiment of the present invention is a technique to perform signal equalization in the presence of, without limitation, chromatic dispersion (CD), polarization mode dispersion (PMD), and phase noise. One embodiment of the invention uses a four-dimensional equalizer structure that effectively compensates high order PMD, as well as CD and effects such as polarization-dependent loss. It may also partially compensate the phase noise of the transmitter and the local oscillator. Traditionally, a polarization diversity receiver would normally add the two polarization components after demodulation and detection. In the receiver in one embodiment of the invention, the phase and polarization components are kept separate and processed as a four dimensional vector (or, equivalently, a two-dimensional complex vector) by the equalizer.

Figure 1:
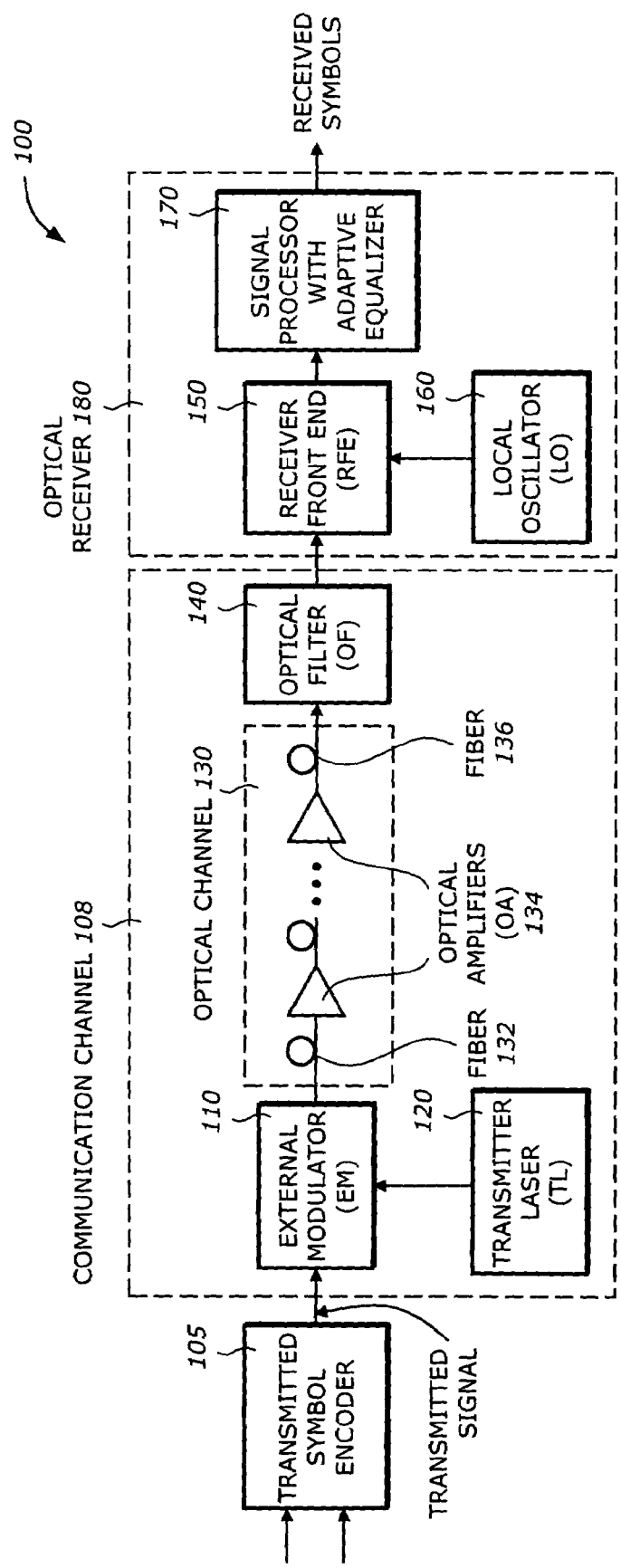
FIG. 1 is a diagram illustrating a system in which one embodiment of the invention can be practiced.

FIG. 1 is a diagram illustrating a system 100 in which one embodiment of the invention can be practiced. The system 100 includes a transmitted symbols encoder 105, a communication channel 108, and a signal processor with adaptive equalizer 170.

The transmitted symbols encoder 105 encodes the transmission bits according to some modulation or encoding technique. In one embodiment, the encoder 105 uses a differential quadrature phase shift keying (DQPSK) modulation technique. DQPSK or other phase and/or amplitude modulation techniques may be applied independently to the two axes of polarization of the optical signal, which allows to double the data rate without increasing the symbol rate. A typical symbol rate may be, without limitation, 10 Gigabauds or higher.

The communication channel 108 transmits the encoded symbols over a fiber optic channel to a receiver. It includes an external modulator (EM) 110, a transmitter laser (TL) 120, an optical channel 130, and an optical filter (OF) 140. In another embodiment, the continuous wave (CW) transmitter laser 120 and the external modulator 110 are replaced by a directly modulated laser.

The external modulator 110 uses the transmitted symbols to modulate the optical carrier generated by the transmitter laser. In general, the modulated optical carrier is a combination of multiple modulation formats. It may be one of an intensity-modulated, amplitude-modulated, an amplitude shift keying (ASK)-modulated, a quadrature amplitude-modulated, phase-modulated, a polarization-modulated, a phase and amplitude modulated, a phase and polarization modulated, an amplitude and polarization modulated, a phase, amplitude or polarization modulated optical carriers. The phase-modulated carrier may be, without limitation, QPSK-modulated, 8PSK-modulated, or differentially phase-modulated. The differentially phase modulated carrier may be, without limitation, DPSK-modulated or DQPSK-modulated. The optical channel 130 provides a transmission medium to transmit the modulated transmitted symbols. Typically, the optical channel has noise or impairments that affect the quality of the transmitted symbols. The impairments of the optical channel 130 may include at least one of chromatic dispersion, polarization mode dispersion, polarization dependent loss, polarization dependent chromatic dispersion, multi-path reflection, phase noise, amplified spontaneous emission noise, intensity modulation noise, thermal noise, interference (e.g., crosstalk) noise, etc. It includes the fiber optic components such as 132 and 136, and one or more optical amplifiers 134. The optical amplifiers 134 amplify the transmitted signal while going through the fiber optic medium. They are deployed periodically along the fiber components such as 132 and 136 to compensate the attenuation. They may introduce amplified spontaneous emission (ASE) noise. The optical filter 140 optically filters the optical transmitted signal. The RFE circuit 150 mixes the filtered optical signal with the output of the local oscillator 160 and demodulates it to a baseband signal. In one embodiment of the invention, the detection is a homodyne detection. In another embodiment of the invention, the detection is heterodyne detection. The RFE circuit 150 is an optical-to-electrical converter to generate an electrical signal vector representing at least one of amplitude, phase, and polarization information of the optical transmitted signal.

The signal processor with adaptive equalizer 170 performs equalization and signal detection to generate received symbols corresponding to the transmitted symbols. It processes the electrical signal vector to compensate the impairments of the optical channel. It can be implemented by analog or digital or a combination of analog and digital elements. In one embodiment, it is implemented using very large scale integration (VLSI) components using complementary metal-oxide semiconductor (CMOS) technology. In another embodiment, it may be implemented by firmware or software with programmable processors. It may be also implemented as a simulator or emulator of a receiving signal processor. The signal processor 170 includes at least an adaptive equalizer to generate an equalized output, a decision, and an error. The error is the difference between the equalized output and the decision. The adaptive equalizer has an adaptation based on at least the error. The adaptation uses at least one of a zero-forcing criterion and a mean-squared error criterion. The adaptive equalizer may be a multidimensional transversal filter equalizer which may be fractionally or baud rate spaced. It equalizes a multidimensional signal having a dimensionality of four or higher and may be adaptively decision-directed trained. It may be any one of the following types: linear, decision feedback, maximum likelihood sequence estimation (MLSE), or any combination of these types. The MLSE equalizer can compensate for nonlinear distortion in the optical fiber (e.g, fibers such as 132 and 136 in FIG. 1). The signal processor 170 includes at least a phase rotator, a polarization angle rotator, and a phase and polarization rotator. The signal processor 170, the receiver front end (RFE) 150, and the local oscillator (LO) 160 form the optical receiver 180 in the system.

The electrical field component (EFC) of the electromagnetic wave at the output of the external modulator 110 (EM) can be written as $$\vec{E}(t) = E_x(t)\vec{x} + E_y(t)\vec{y} = (e_1 + je_2)\vec{x} + (e_3 + je_4)\vec{y}, \quad (1)$$

where $e_1$ and $e_2$ are the in-phase and quadrature components of the $\vec{x}$-aligned EFC $E_x(t)$, while $e_3$ and $e_4$ are the corresponding components of the $\vec{y}$-aligned EFC $E_y(t)$. $\vec{x}$ and $\vec{y}$ are unit vectors along the orthogonal axes of polarization. Notice that $\vec{E}(t)$ can be treated either as a 4-dimensional real vector or as a 2-dimensional complex vector. In (1) j means imaginary unit (i.e. $j=\sqrt{-1}$). Let $\tilde{E}(\omega) = [E_x(\omega) E_y(\omega)]^{T_r}$ be the Fourier transform of vector $\vec{E}(t)$ where $T_r$ denotes transpose. Then, ignoring the nonlinear effects and polarization dependent loss (PDL), the fiber propagation equation that takes into account all order PMD, chromatic dispersion, and attenuation is given by:

$$\begin{bmatrix} \hat{E}_x(\omega) \\ \hat{E}_y(\omega) \end{bmatrix} = e^{-\alpha L} e^{-j\beta(\omega)L} j\tilde{E}(\omega) \qquad (2)$$

$$= e^{-\alpha L} e^{-j\beta(\omega)L} \begin{bmatrix} u_1(\omega) & u_2(\omega) \\ -u_2^*(\omega) & u_1^*(\omega) \end{bmatrix} \begin{bmatrix} E_x(\omega) \\ E_y(\omega) \end{bmatrix}$$

In this model, J is the well-known Jones matrix. This model accounts for high order PMD. Parameter $\beta(\omega)$, which accounts for chromatic dispersion, is obtained by averaging the propagation constants of the two principal states of polarization $\beta(\omega) = (\beta_x(\omega) + \beta_y(\omega))/2$. Parameter $\alpha$ is the fiber loss. In practical systems, it can be assumed to be a constant within the signal bandwidth. L is the fiber length.

Figure 2:
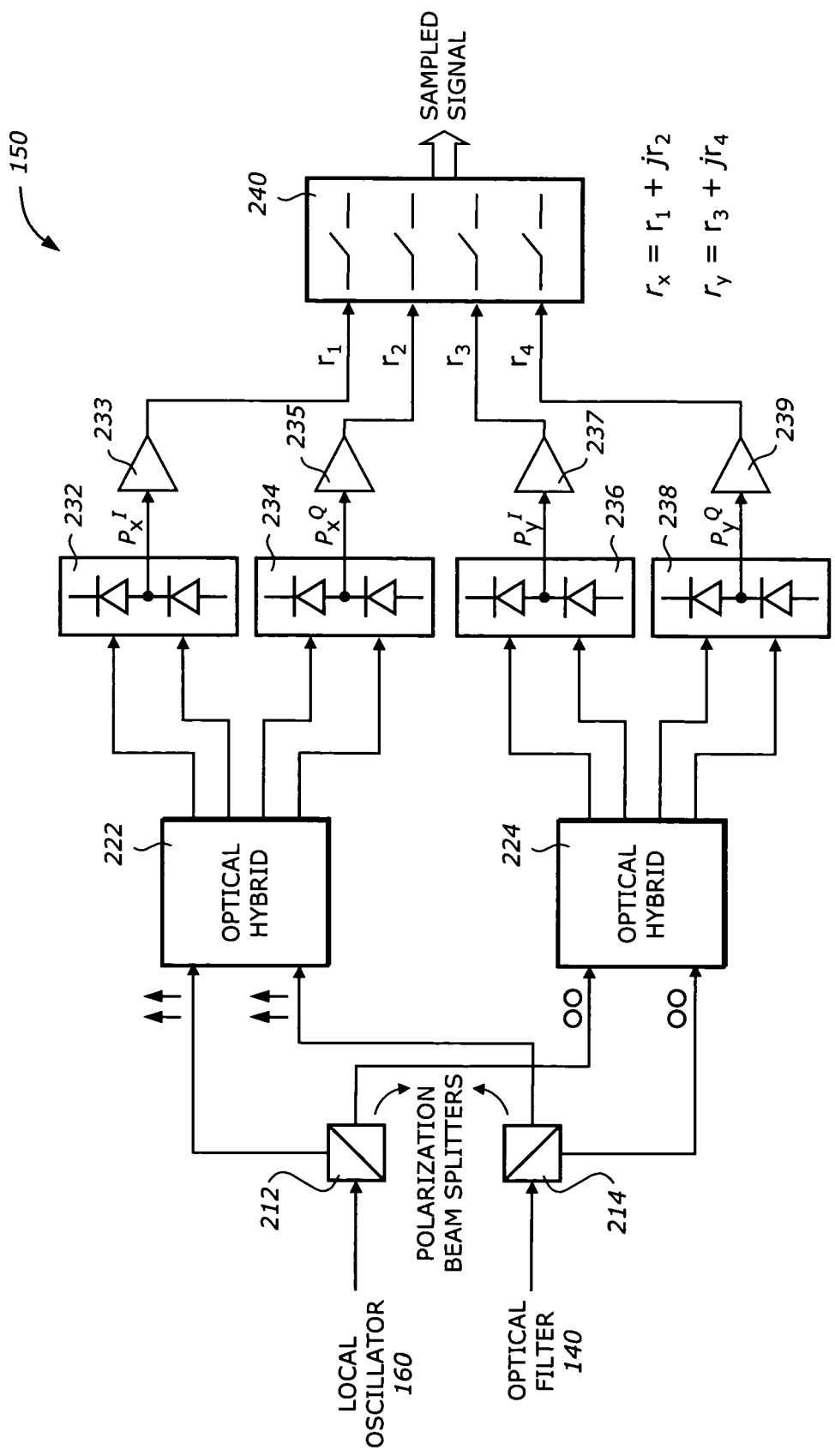
FIG. 2 is a diagram illustrating a receiver front end according to one embodiment of the invention.

FIG. 2 is a diagram illustrating the receiver front end (RFE) circuit 150 according to one embodiment of the invention. The RFE circuit 150 includes two polarization beam splitters 212 and 214, two optical hybrid circuits 222 and 224, four balanced photodiodes 232, 234, 236, and 238, four transimpedance amplifiers (TIAs) 233, 235, 237 and 239, and a sampler 240. The receiver front end 150 is an optical to electrical converter that produces an electrical signal vector representing at least one of amplitude, phase, and polarization information of the modulated optical carrier transmitted through the optical channel 130 with impairments.

The polarization beam splitters 212 and 214 separate the polarization components of the corresponding outputs of the local oscillator 160 and the optical filter 140, respectively. The local oscillator 160 is linearly polarized at π/4 with respect to the receiver reference axes. The two hybrid circuits 222 and 224 have four ports and combine the split components of the optical signals from the optical filter 140 and the local oscillator 160.

The balanced photodiodes 232, 234, 236, and 238 detect the electrical field components (EFCs) at the outputs of the hybrid circuits 222 and 224 to produce four signals $r_1$, $r_2$, $r_3$, and $r_4$. This balanced architecture has the advantage of suppressing the relative intensity noise (RIN).

Assume that (i) all photodiodes responsivities are equal to unity, and (ii) TIAs gains are equal to K. The currents at the output of each photodiode for the $\vec{x}$ polarization are given by:

$$P_{1x}=|E_{LO}|^2+|\hat{E}_x(t)|^2+2\text{Re}\{\hat{E}_x(t)E^*_{LO}e^{j((\omega_s-\omega_{LO})t+\phi_x(t))}\},$$

$$P_{2x}=|E_{LO}|^2+|\hat{E}_x(t)|^2-2\text{Re}\{\hat{E}_x(t)E^*_{LO}e^{j((\omega_s-\omega_{LO})t+\phi_x(t))}\},$$

$$P_{3x}=|E_{LO}|^2+|\hat{E}_x(t)|^2+2\text{Im}\{\hat{E}_x(t)E^*_{LO}e^{j((\omega_s-\omega_{LO})t+\phi_x(t))}\},$$

$$P_{4x}=|E_{LO}|^2+|\hat{E}_x(t)|^2-2\text{Im}\{\hat{E}_x(t)E^*_{LO}e^{j((\omega_s-\omega_{LO})t+\phi_x(t))}\}, \quad (3)$$

where $\hat{E}_x(t)$ and $E_{LO}$ are the complex electrical fields envelopes of the received signal and local oscillator, respectively, $\omega_s$ and $\omega_{LO}$ are their angular optical frequencies, and $\phi_x(t)$ accounts for phase noise in the $\vec{x}$ polarization.

In a similar way, the currents at the output of each photodiode for the $\vec{y}$ polarization are given by:

$$P_{1y}=|E_{LO}|^2+|\hat{E}_y(t)|^2+2\text{Re}\{\hat{E}_y(t)E^*_{LO}e^{j((\omega_s-\omega_{LO})t+\phi_y(t))}\}$$

$$P_{2y}=|E_{LO}|^2+|\hat{E}_y(t)|^2-2\text{Re}\{\hat{E}_y(t)E^*_{LO}e^{j((\omega_s-\omega_{LO})t+\phi_y(t))}\}$$

$$P_{3y}=|E_{LO}|^2+|\hat{E}_y(t)|^2+2\text{Im}\{\hat{E}_y(t)E^*_{LO}e^{j((\omega_s-\omega_{LO})t+\phi_y(t))}\}$$

$$P_{4y}=|E_{LO}|^2+|\hat{E}_y(t)|^2-2\text{Im}\{\hat{E}_y(t)E^*_{LO}e^{j((\omega_s-\omega_{LO})t+\phi_y(t))}\}. \quad (4)$$

Due to the balanced detection, currents on the balanced photodiodes are subtracted to provide:

$$P_x^I=P_{1x}-P_{2x}=4\text{Re}\{\hat{E}_x(t)E^*_{LO}e^{j((\omega_s-\omega_{LO})t+\phi_x(t))}\},$$

$$P_x^Q=P_{3x}-P_{4x}=4\text{Im}\{\hat{E}_x(t)E^*_{LO}e^{j((\omega_s-\omega_{LO})t+\phi_x(t))}\},$$

$$P_y^I=P_{1y}-P_{2y}=4\text{Re}\{\hat{E}_y(t)E^*_{LO}e^{j((\omega_s-\omega_{LO})t+\phi_y(t))}\},$$

$$P_y^Q=P_{3y}-P_{4y}=4\text{Im}\{\hat{E}_y(t)E^*_{LO}e^{j((\omega_s-\omega_{LO})t+\phi_y(t))}\}. \quad (5)$$

Finally, the signals at the input of sampler 240 are:

$$r_1=KP_x^I,$$

$$r_2=KP_x^Q,$$

$$r_3=KP_y^I,$$

$$r_4=KP_y^Q. \quad (6)$$

$$r_x=r_1+jr_2$$

$$r_y=r_3+jr_4 \quad (7)$$

The $r_1$ and $r_2$ signals are the in-phase and quadrature components of the received EFC $\hat{E}_x(t)$. The $r_3$ and $r_4$ signals are the in-phase and quadrature components of the received EFC $\hat{E}_y(t)$. Without loss of generality, the demodulation may be considered an ideal homodyne demodulation, that is $\omega_{LO}=\omega_s$.

The sampler 240 samples the signals $r_1$, $r_2$, $r_3$, and $r_4$ to produce the sampled signals. The sampling rate may be at the symbol period T or a fraction of T if a fractionally spaced processing is used. The sampled signals then go to the signal processor with adaptive equalizer 170 for further detection. For analog implementation, the sampled signals are discrete-time signals. For digital implementation, the sampled signals may go through analog-to-digital conversors to produce digital data.

The noise sources present in the system include, without limitation, amplified spontaneous emission (ASE), shot, thermal, and phase noise. In DWDM systems they may also include four-wave mixing (FWM) and cross-phase modulation (CPM). ASE noise is introduced by optical amplifiers and can be modeled as additive white Gaussian noise (AWGN) in each polarization in the electromagnetic field domain. Shot noise has a Poisson distribution, but for large numbers of incident photons its distribution can be closely approximated as a Gaussian. Thermal noise from the analog front-end of the receiver is modeled as a Gaussian variable. Phase noise is also present in the signal, as a result of phase fluctuations in the transmitter laser, and the local oscillator laser and other optical components such optical amplifiers. It is usually characterized as a Wiener process, $\phi(t) \triangleq \int_0^t \phi'(\tau)d\tau$, where the time derivative $\phi'(t)$ is a zero-mean white Gaussian process with a power spectral density $S_{\phi'(\omega)}=2\pi\Delta\nu$, and $\Delta\nu$ is defined as the laser line width parameter. As seen in equations (3) and (4), different phase noise components $\phi_x(t)$ and $\phi_y(t)$ have been introduced for each polarization. Lasers diodes with $\Delta\nu \approx 1$-5 MHz are available today. The problem of phase noise can be reduced using differential PSK (DPSK) modulation, where the information is encoded by changes in phase from one symbol to the next. FWM and CPM are the result of crosstalk among different wavelengths in a DWDM system. The crosstalk is originated by nonlinearities.

The decoding or signal detection technique may be implemented by a synchrodyne detection or a differential detection scheme. The synchrodyne detection results in a lower penalty than the differential detection. One embodiment of the invention uses synchrodyne detection.

Figure 3:
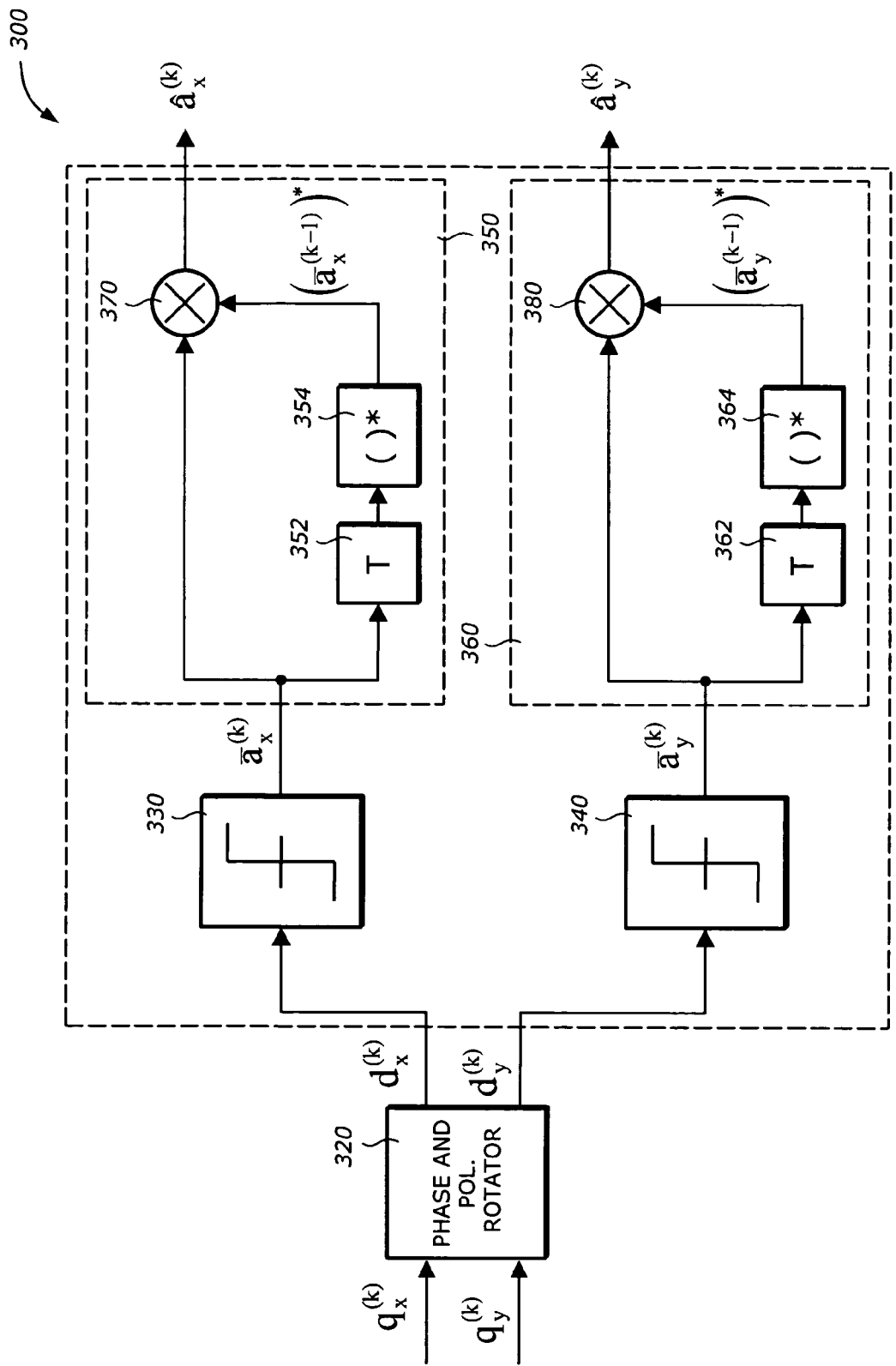
FIG. 3 is a diagram illustrating a synchrodyne detector according to one embodiment of the invention.

FIG. 3 is a diagram illustrating a synchrodyne detector 300 according to one embodiment of the invention. The detector 300 includes a rotator 320, slicers 330 and 340, and differential decoders 350 and 360. The rotator 320 rotates the phase and polarity of the inputs $q_x^{(k)}$ and $q_y^{(k)}$ to produce $d_x^{(k)}$ and $d_y^{(k)}$.

The slicers 330 and 340 essentially slice the inputs $d_x^{(k)}$ and $d_y^{(k)}$, respectively, by some predetermined threshold. The differential decoders 350 and 360 subtract the phases by multiplying the symbol with the complex conjugate of the delayed symbol. The differential decoder 350 includes a delay element 352, a complex conjugator 354, and a multiplier 370. The differential decoder 360 includes a delay element 362, a complex conjugator 364, and a multiplier 380. The delay elements 352 and 362 delay the slicer outputs $\bar{a}_x^{(k)}$ and $\bar{a}_y^{(k)}$, respectively, by a symbol period. The complex conjugators 354 and 364 obtain the complex conjugates of the delayed $\bar{a}_x^{(k-1)}$ and $\bar{a}_y^{(k-1)}$, to produce $(\bar{a}_x^{(k-1)})^*$ and $(\bar{a}_y^{(k-1)})^*$, respectively. The multipliers 370 and 380 multiply $\bar{a}_x^{(k)}$ with $(\bar{a}_x^{(k-1)})^*$ and $\bar{a}_y^{(k)}$ with $(\bar{a}_y^{(k-1)})^*$, respectively, to produce $\hat{a}_x^{(k)}$ and $\hat{a}_y^{(k)}$:

$$\hat{a}_x^{(k)}=\bar{a}_x^{(k)} \cdot (\bar{a}_x^{(k-1)})^* \quad (8)$$

$$\hat{a}_y^{(k)}=\bar{a}_y^{(k)} \cdot (\bar{a}_y^{(k-1)})^* \quad (9)$$

Figure 4:
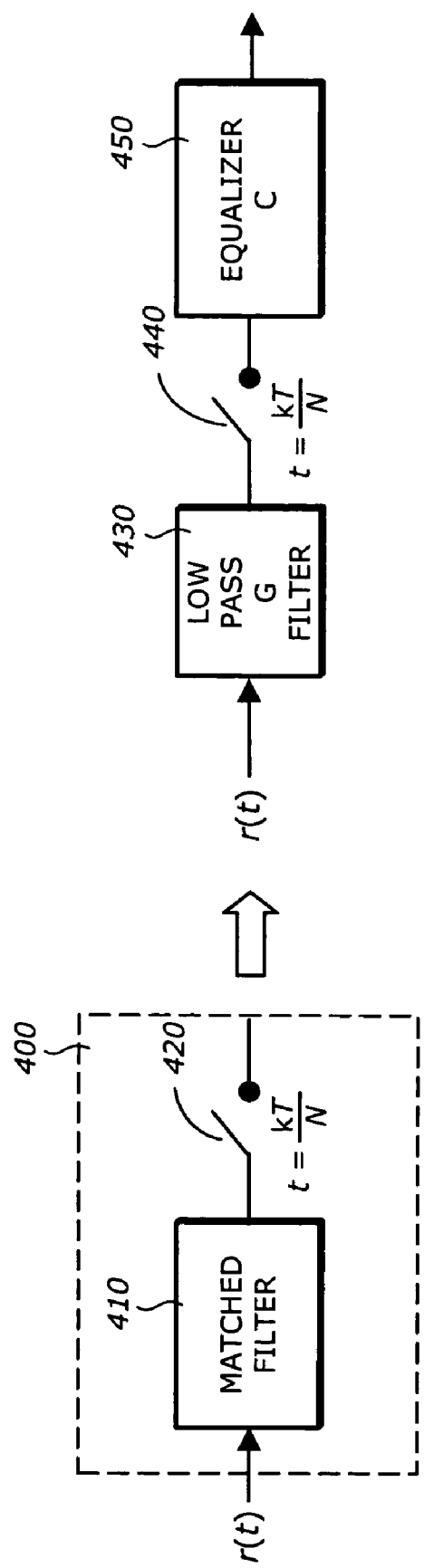
FIG. 4 is a diagram illustrating a matched filter according to one embodiment of the invention.

FIG. 4 is a diagram illustrating a matched filter circuit 400 according to one embodiment of the invention.

The matched filter circuit 400 includes a matched filter (MF) 410 and a sampler 420. It is possible to verify that the MF 410 compensates most of the channel impairments and no further signal processing is needed prior to detection. In real situations, the MF 410 is hard to synthesize because of the complexity of the channel response and its non-stationary nature due to the PMD. An alternative structure for the receiver is to use a low pass filter G 430, followed by a sampler 440 and an equalizer C 450 as shown in FIG. 4. The output of the low pass filter G 430 includes the noise components $n_x^{(k)}$ and $n_y^{(k)}$.

Figure 5A:
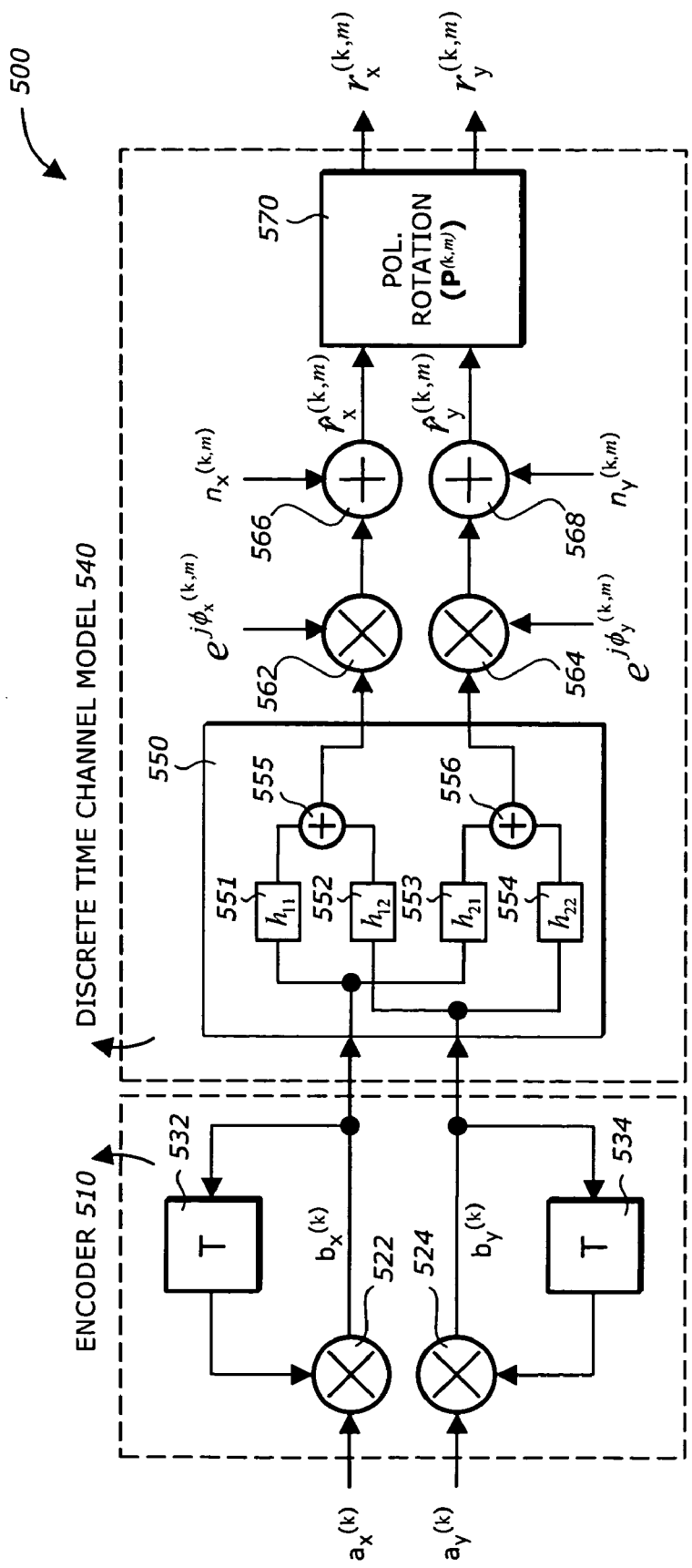
FIG. 5A is a diagram illustrating a model for a transmission optical channel according to one embodiment of the invention.

FIG. 5A is a diagram illustrating an equivalent model 500 for a transmission optical channel according to one embodiment of the invention. The model 500 includes an encoder 510 and a discrete time channel model 540.

The encoder 510 is a model for the transmitted symbol encoder 105 shown in FIG. 1. It includes multipliers 522 and 524 and delay elements 532 and 534. At the transmitter, the M-ary differential phase shift keying (MDPSK) symbols $a_j \in A = \{e^{j2\pi v/M} | v \in \{0,1,\ldots,M-1\}\}$ j=x,y are differentially encoded. The resulting MPSK symbols are:

$$b_j^{(k)} = a_j^{(k)} b_j^{(k-1)} \quad (10)$$

where j=x,y.

The baseband equivalent model of the channel is defined by $$H(t) = \begin{bmatrix} h_{11}(t) & h_{12}(t) \\ h_{21}(t) & h_{22}(t) \end{bmatrix}, \quad (11)$$

with $$h_{11}(t) = \mathfrak{S}^{-1}(e^{-j\beta(\omega)L} u_1(\omega)) \otimes f(t)$$

$$h_{12}(t) = \mathfrak{S}^{-1}(e^{-j\beta(\omega)L} u_2(\omega)) \otimes f(t)$$

$$h_{21}(t) = \mathfrak{S}^{-1}(-e^{-j\beta(\omega)L} u^*_2(\omega)) \otimes f(t)$$

$$h_{22}(t) = \mathfrak{S}^{-1}(e^{-j\beta(\omega)L} u^*_1(\omega)) \otimes f(t) \quad (12)$$

where f(t) is the impulse response that includes the low pass filter 430 as well as any other linear element in the link, and $\mathfrak{S}^{-1}$ represents the inverse Fourier transform operator.

The equalizer is, in general, fractionally spaced with sampling rate N times higher than the symbol rate, the channel may be modeled by N sub-filters $580_1$ to $580_N$ $h_{ij}^{(m)}$ with m=0,1,...,N-1 and i,j=1,2, corresponding to N sampling instants $$t = \left(k + \frac{m}{N}\right)T$$

per symbol period T. The sampling rate of each sub-filter is the same as the symbol rate, 1/T. Note that the rate of the output selector 585 is N times the symbol rate, that is, N/T Then, the discrete model of the equivalent channel can be written as:

$$h_{11}^{(m)} = \{h_{11}^{(0,m)}, h_{11}^{(1,m)}, \ldots, h_{11}^{(L_{h,m}-1,m)}\},$$

$$h_{12}^{(m)} = \{h_{12}^{(0,m)}, h_{12}^{(1,m)}, \ldots, h_{12}^{(L_{h,m}-1,m)}\},$$

$$h_{21}^{(m)} = \{h_{21}^{(0,m)}, h_{21}^{(1,m)}, \ldots, h_{21}^{(L_{h,m}-1,m)}\},$$

$$h_{22}^{(m)} = \{h_{22}^{(0,m)}, h_{22}^{(1,m)}, \ldots, h_{22}^{(L_{h,m}-1,m)}\}, \quad (13)$$

where $L_{h,m}$ is the number of coefficient of m-th sub-filter. Note that the total number of coefficients needed to model the channel is $$L_h = \sum_{m=0}^{N-1} L_{h,m}.$$

In addition, the samples at the input of the channel model are spaced T seconds apart, while the output samples are spaced T/N seconds apart.

The discrete time channel model includes a fiber model H 550, two multipliers 562 and 564, two adders 566 and 568, and a polarization rotator 570. The fiber model H 550 has the coefficients $h_{ij}$. It acts like a finite impulse response (FIR) filter operating on the MPSK symbols $b_x^{(k)}$ and $b_y^{(k)}$ as shown above. The multipliers 562 and 564 introduce the phases shift of $\phi_x^{(k)}$ and $\phi_y^{(k)}$. The adders 566 and 568 add the noise components at the output of the low pass filter 430 $n_x^{(k,m)}$ and $n_y^{(k,m)}$ to the output of the H filter to generate $\hat{r}_x^{(k,m)}$ and $\hat{r}_y^{(k,m)}$. The polarization rotator 570 rotates the polarization of $\hat{r}_x^{(k,m)}$ and $\hat{r}_y^{(k,m)}$. It is represented by a matrix $P^{(k,m)}$ to model variations in the angle of polarization, due to imperfections in the transmitter and local oscillator laser.

The received samples at the outputs of the channel can be expressed as:

$$\begin{bmatrix} r_x^{(k,m)} \\ r_y^{(k,m)} \end{bmatrix} = P^{(k,m)} \begin{bmatrix} \hat{r}_x^{(k,m)} \\ \hat{r}_y^{(k,m)} \end{bmatrix}, \quad (14)$$

where $$P^{(k,m)} = \begin{bmatrix} \cos(\theta^{(k,m)}) & -\sin(\theta^{(k,m)}) \\ \sin(\theta^{(k,m)}) & \cos(\theta^{(k,m)}) \end{bmatrix}, \quad (15)$$

$$\hat{r}_x^{(k,m)} = e^{j\phi_x^{(k,m)}} \left( \sum_{n=0}^{L_{k,m}-1} h_{11}^{(n,m)} b_x^{(k-n)} + \sum_{n=0}^{L_{k,m}-1} h_{12}^{(n,m)} b_y^{(k-n)} \right) + n_x^{(k,m)} \quad (16)$$

$$\hat{r}_y^{(k,m)} = e^{j\phi_y^{(k,m)}} \left( \sum_{n=0}^{L_{k,m}-1} h_{21}^{(n,m)} b_x^{(k-n)} + \sum_{n=0}^{L_{k,m}-1} h_{22}^{(n,m)} b_y^{(k-n)} \right) + n_y^{(k,m)} \quad (17)$$

The received samples include the effects of rotations of the polarization angle.

The fiber model 550 includes sub-filter groups $h_{11}$ 551, $h_{12}$ 552, $h_{21}$ 553, $h_{22}$ 554, and two adders 555 and 556. The adder 555 adds the outputs of sub-filter groups 551 and 552. The adder 556 adds the outputs of sub-filters groups 553 and 554.

Figure 5B:
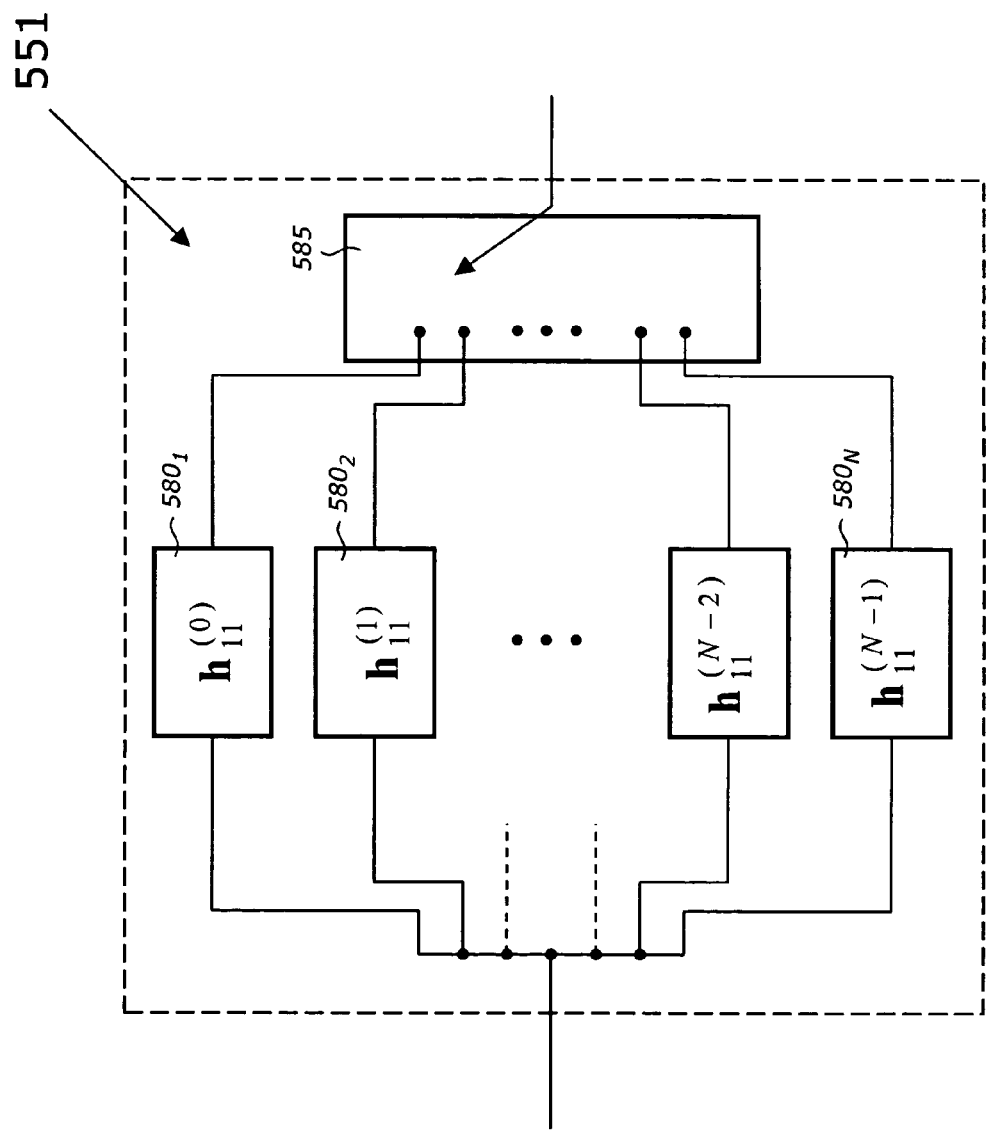
FIG. 5B is a diagram illustrating a sub-filter group used in the fiber model according to one embodiment of the invention

FIG. 5B is a diagram illustrating a sub-filter group 551 used in the fiber model 550 according to one embodiment of the invention. The sub-filter group 551 is representative of the groups 551, 552, 553, and 554. The sub-filter group 551 includes N sub-filters $580_1$ to $580_N$ and an output selector 585.

Each of the sub-filters $580_1$ to $580_N$ represent a filter operating at the symbol rate of 1/T. The output selector 585 selects the sub-filters $580_1$ to $580_N$ at a selection rate of N/T.

Based on these equations that model the discrete time channel, the signal processor that process the received signals $r_x^{(k)}$ and $r_y^{(k)}$ may be developed. The signal processor generates the received symbols that correspond to the transmitted symbols.

Figure 6:
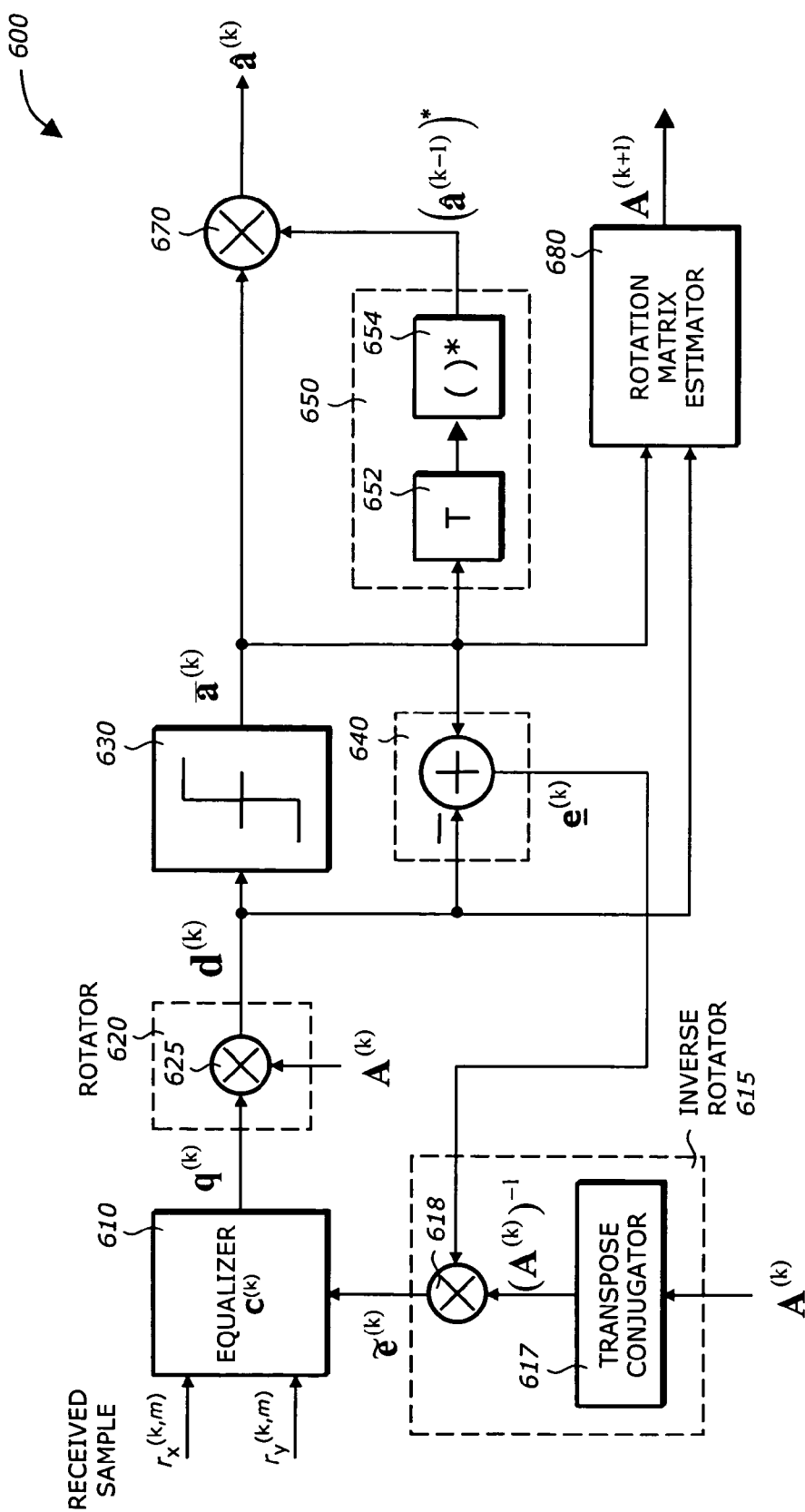
FIG. 6 is a diagram illustrating a signal processor with adaptive equalizer according to one embodiment of the invention.

FIG. 6 is a diagram illustrating the signal processor with adaptive equalizer 600 according to one embodiment of the invention. The model 600 includes an equalizer 610, inverse rotator 615, a rotator 620, a slicer 630, an error calculator 640, a delay conjugator 650, a multiplier 670, and a rotation matrix estimator 680.

The model 600 in essence represents the signal processor 170 shown in FIG. 1. It performs signal equalization and detection to generate the received symbols $\hat{a}_x^{(k)}$ and $\hat{a}_y^{(k)}$. For clarity, the elements in the model are shown to operate on column vectors. Each vector represents the first and second dimensions x and y. Therefore, each element except the inputs to the equalizer 610 represents two complex elements, one operating on the x dimension and the other operating on the y dimension.

The adaptive equalizer 610 equalizes the received samples $r_x^{(k)}$ and $r_y^{(k)}$ using coefficient matrix $C^{(k,m)}$. It may be an adaptive equalizer. It may be adaptively decision-directed trained. It is contemplated that although the equalizer 610 is described in the context of an optical receiver, it may be used in other non-optical applications, such as digital microwave radio receivers that use the polarization of the electromagnetic waves to carry more information. It may also be used in applications where there is no polarization information such as Orthogonal Frequency Division Multiplexing (FDM) receivers. The equalizer 610 generates the equalized samples $q_x^{(k)}$ and $q_y^{(k)}$. Since the equalizer can be in general fractionally spaced, the coefficients can be described by N matrices, or sub-equalizers, each one working at the symbol rate as follows $$C^{(k,m)} = \begin{bmatrix} c_{11}^{(k,m)} & c_{12}^{(k,m)} \\ c_{21}^{(k,m)} & c_{22}^{(k,m)} \end{bmatrix}, \tag{18}$$

where m=0,1, ..., N−1, $c_{ij}^{(k,m)} = \{c_{ij}^{(km)(0)}, c_{ij}^{(k,m)(1)}, \ldots, c_{ij}^{(k,m)(L_{c,m}-1)}\}$ with i,j=1,2.

Parameter $L_{c,m}$ is the number of coefficients of m-th sub-equalizer. The output of the equalizer is obtained by adding all sub-equalizers outputs, and the total number of coefficients of the equalizer is $$L_c = \sum_{m=0}^{N-1} L_{c,m}.$$

The received samples $r_x^{(k,m)}$ and $r_y^{(k,m)}$ are processed by the adaptive equalizer 610, whose sampling rate is, in general, N times the baud rate. Note that samples at the baud rate are needed to feed the detector. Therefore, among the N samples at the equalizer output existing in a period T, the one corresponding to a certain instant $m_0$ ($m_0 \in \{0,1,\ldots,N-1\}$) is selected. Clearly, samples corresponding to values of m different from $m_0$ do not need to be computed. For simplicity of notation, index $m_0$ is dropped from all signals at the output of the equalizer. Furthermore, $m_0$ may be considered zero since the equalizer coefficients are automatically adjusted by the coefficient generator algorithm. Thus, the equalizer output samples to be processed by the detector, at baud rate, may be expressed as:

$$q_x^{(k)} = \sum_{l=0}^{N-1} \sum_{n=0}^{L_{c,l}-1} c_{11}^{(k,l)(n)} r_x^{(k-n,1)} + \sum_{l=0}^{N-1} \sum_{n=0}^{L_{c,l}-1} c_{21}^{(k,l)(n)} r_y^{(k-n,1)} \tag{19}$$

$$q_y^{(k)} = \sum_{l=0}^{N-1} \sum_{n=0}^{L_{c,l}-1} c_{12}^{(k,l)(n)} r_x^{(k-n,1)} + \sum_{l=0}^{N-1} \sum_{n=0}^{L_{c,l}-1} c_{22}^{(k,l)(n)} r_y^{(k-n,1)}$$

The inverse rotator 615 generates a rotated error vector $\tilde{e}^{(k)}$ using the phase and polarization rotation matrix $A^{(k)}$ from the rotation matrix estimator 680 and the error vector $e^{(k)}$ from the error calculator 640. It includes a transpose conjugator 617 and a multiplier 618. The transpose conjugator 617 computes the inverse of the phase and polarization rotation matrix $A^{(k)}$.

Since the matrix $A^{(k)}$ is unitary, its inverse $(A^{(k)})^{-1}$ is equal to $(A^{(k)})^H$ where H denotes the transpose conjugate. The multiplier 618 multiplies the error vector $e^{(k)}$ with the inverse $(A^{(k)})^{-1}$ to generate the rotated error vector $\tilde{e}^{(k)}$. The multiplication is a matrix per vector product.

$$\tilde{e}^{(k)} = (A^{(k)})^{-1} \cdot e^{(k)} \tag{20}$$

In one embodiment, the rotator 620 rotates the phase and polarization of the equalized samples $q^{(k)}$ to generate the rotated vector $d^{(k)}$. It includes a multiplier 625 to perform a matrix per vector multiplication of $A^{(k)}$ and $q^{(k)}$ as follows:

$$d^{(k)} = A^{(k)} \cdot q^{(k)} \tag{21}$$

where:

$$d^{(k)} = \begin{bmatrix} d_x^{(k)} \\ d_y^{(k)} \end{bmatrix} \text{ and } q^{(k)} = \begin{bmatrix} q_x^{(k)} \\ q_y^{(k)} \end{bmatrix} \tag{22}$$

In another embodiment, the rotator 620 rotates the phase and polarization of the received samples before equalization. In other words, the rotator 620 may be placed after or before the equalizer 610. The vector $d^{(k)}$, therefore, may represent a rotated-then-equalized vector or an equalized-then-rotated vector. For brevity, the vector $d^{(k)}$ is referred to as the slicer input vector.

The slicer 630 thresholds the slicer input vector $d^{(k)}$ by a predetermined threshold to generate a slicer output vector $\bar{a}^{(k)}$. The error calculator 640 calculates an error vector $e^{(k)}$. It includes an adder/subtractor to subtract the slicer input vector $d^{(k)}$ from the slicer output vector $\bar{a}^{(k)}$. The error vector $e^{(k)}$ is given as follows:

$$e^{(k)} = \begin{bmatrix} e_x^{(k)} \\ e_y^{(k)} \end{bmatrix} = \begin{bmatrix} \bar{a}_x^{(k)} - d_x^{(k)} \\ \bar{a}_y^{(k)} - d_y^{(k)} \end{bmatrix} \tag{23}$$

The delay conjugator 650 generates a delayed conjugated vector $(\bar{a}^{(k-1)})^*$ from the slicer output vector $\bar{a}^{(k)}$. It includes a delay element 652 and a conjugator 654. The delay element 652 delays the slicer output vector $\bar{a}^{(k)}$ by one sample. The conjugator 654 provides the complex conjugate of the delayed $\bar{a}^{(k)}$.

The multiplier 670 generates the received symbol vector $\hat{a}^{(k)}$ which is an estimate of the transmitted symbol vector. The multiplier 670 multiplies, element by element, the slicer output vector $\bar{a}^{(k)}$ with the delayed conjugated vector $(\bar{a}^{(k-1)})^*$.

The rotation matrix estimator 680 generates the phase and polarization rotation matrix $A^{(k)}$ from the slicer input vector $d^{(k)}$ and the slicer output vector $\bar{a}^{(k)}$. The rotation matrix estimator 680 will be described in detail in FIG. 8.

Figure 7:
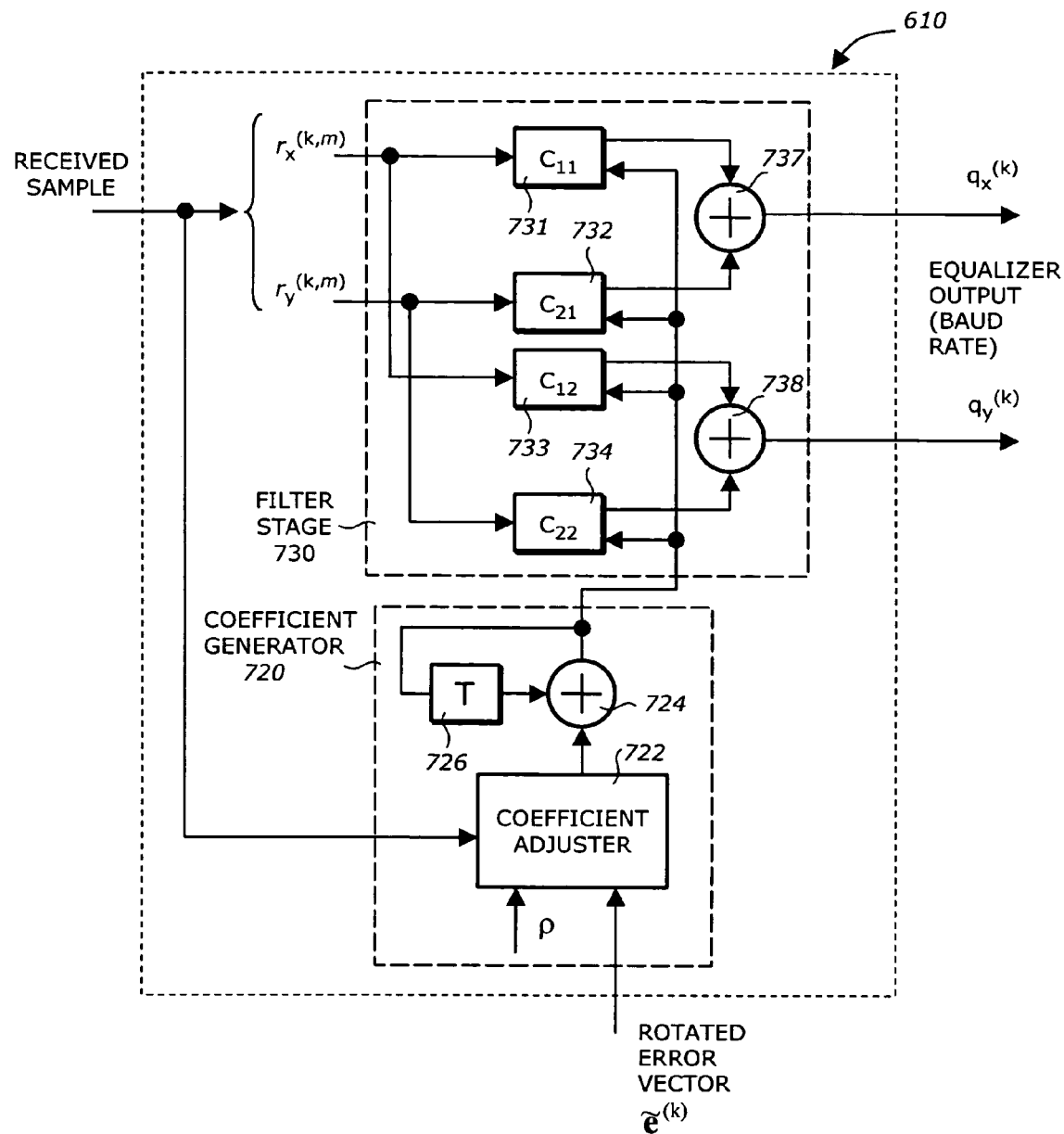
FIG. 7 is a diagram illustrating an equalizer according to one embodiment of the invention.

FIG. 7 is a diagram illustrating the equalizer 610 according to one embodiment of the invention. The equalizer 610 includes a coefficient generator 720 and a filter stage 730. The equalizer 610 operates on multidimensional vector or elements. In the following description, for illustrative purposes, only four filters and two dimensions are shown. It is contemplated more or less than four filters and more or less than two dimensions may be used.

The coefficient generator 720 generates the filter coefficients to the filter stage 730 using the rotated error vector $\tilde{e}^{(k)}$ provided by the inverse rotator 615 (FIG. 6). It includes a coefficient adjuster 722, an adder 724, and a delay element 726.

The filter coefficients may be adaptively generated based on some optimality criterion. Two criteria may be considered to find the filter coefficients: the peak distortion criterion and the minimum mean squared error (MMSE) criterion. The peak distortion criterion may eliminate the dispersion effect by inverting the channel response. However, noise amplification may occur. The MMSE criterion reduces noise enhancement and can achieve better performance. In one embodiment, the MMSE criterion is used. To determine the filter coefficients, a stochastic gradient technique is used. The filter coefficient vector is recursively calculated using a coefficient adjustment vector based on the error vector and the estimated phase value.

The coefficient adjuster 722 generates a coefficient adjustment vector to adjust the coefficient vector $C^{(k,m)}$ of the filter coefficients. The coefficient adjustment vector is a product of the rotated error vector $\tilde{e}^{(k)}$, a received sample vector representing the received samples $R^{(km)}$, and a step size parameter $\rho$. The adder 724 adds the previously calculated coefficient vector $C^{(k,m)}$ to the coefficient adjustment vector to generate the coefficient vector representing the filter coefficients. The previously calculated coefficient vector may be obtained by the delay element 726. The delay element 726 may be implemented as a storage register. The coefficient generator 720, therefore, calculates the adaptive coefficient filter vector as follows:

$$C^{(k+1,m)} = C^{(k,m)} + \rho [R^{(k,m)}]^H [\tilde{e}^{(k)}]^{Tr}, \quad (24)$$

where H denotes conjugate transpose, Tr denotes transpose; $R^{(k,m)} = [r_x^{(k,m)} r_y^{(k,m)}]$, $r_x^{(k,m)}$ and $r_y^{(k,m)}$ are the $L_{c,m}$-dimensional row vectors with the received samples at instant k; and $\rho$ is the step size parameter. In one embodiment, $0.0001 \leq \rho \leq 0.001$. The coefficient filter vector $C^{(k,m)}$ is:

$$C^{(k,m)} = \begin{bmatrix} c_{11}^{(k,m)} & c_{12}^{(k,m)} \\ c_{21}^{(k,m)} & c_{22}^{(k,m)} \end{bmatrix}, \quad (25)$$

where $c_{ij}^{(k,m)}$ are the $L_{c,m}$-dimensional column vectors with equalizer coefficients at the instant k and subequalizer m.

The filter stage 730 generates equalized samples or a slicer input vector (when the rotator 620 is placed before the equalizer 610) from the received samples using the filter coefficients provided by the coefficient generator 720 and the received samples $R^{(k,m)}$ provided by the receiver front end circuit 150 in the optical transmission channel 108 (FIG. 1) carrying transmitted symbols.

The filter stage includes at least four finite impulse response (FIR) filters 731, 732, 733, and 734, and two adders 737 and 738. The four FIR filters 731, 732, 733, and 734 operate on the at least four filter coefficient vectors $c_{11}$, $c_{12}$, $c_{21}$, and $c_{22}$, respectively, and the received samples $r_x^{(k)}$ and $r_y^{(k)}$, to produce at least four filtered results. The four filter coefficient vectors $c_{11}$, $c_{12}$, $c_{21}$, and $c_{22}$ are spanned on first and second dimensions x and y. The two adders 737 and 738 add the filtered results on the first and second dimensions x and y, respectively, to generate the equalized samples $q_x^{(k)}$ and $q_y^{(k)}$ as shown in equation (19). These equalized samples are then processed in subsequent stages as shown in FIG. 6.

Figure 8:
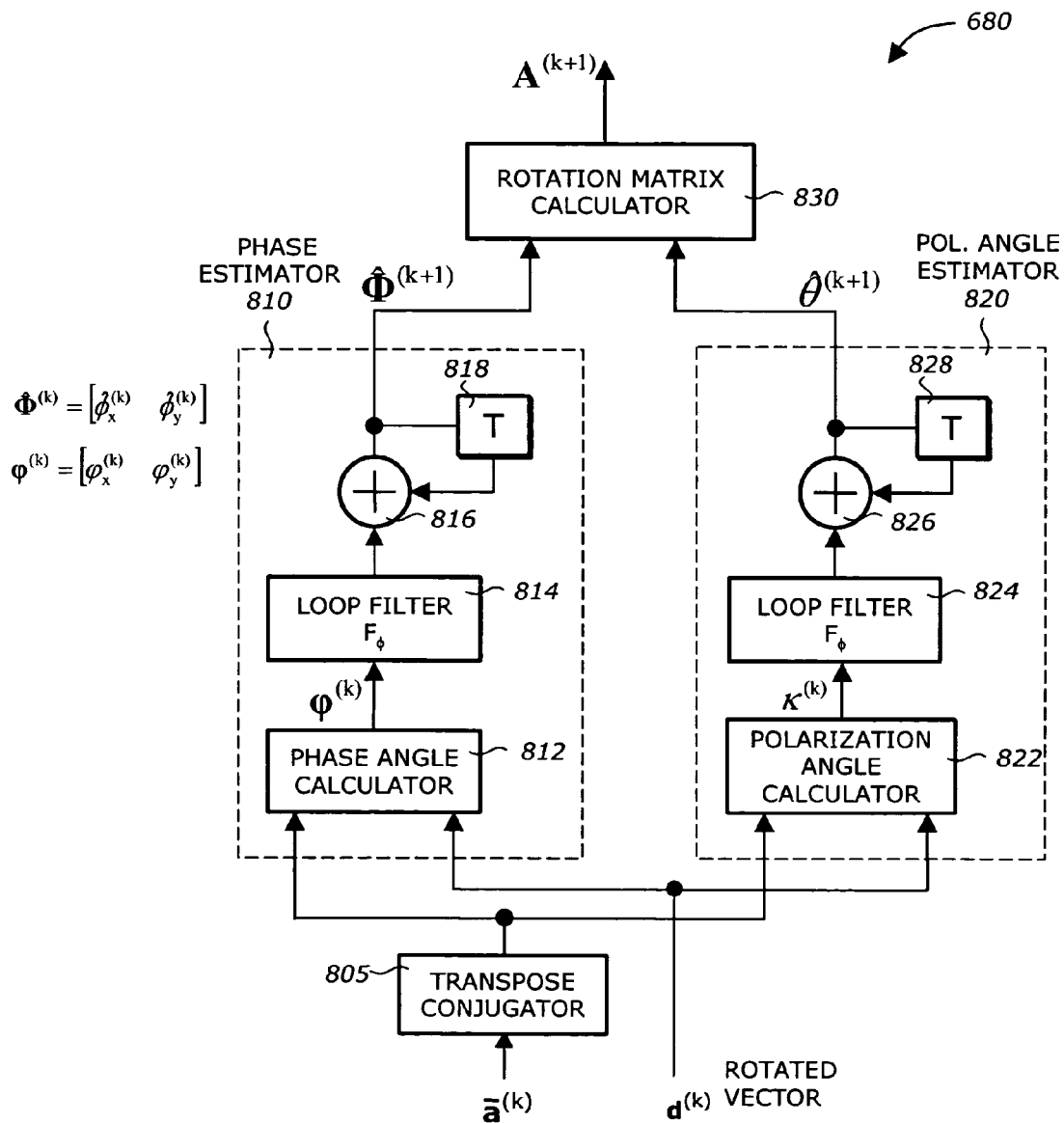
FIG. 8 is a diagram illustrating a rotation matrix estimator according to one embodiment of the present invention.

FIG. 8 is a diagram illustrating a rotation matrix estimator 680 according to one embodiment of the present invention. It generates the phase and polarization rotation matrix $A^{(k)}$ from the slicer output vector $\bar{a}^{(k)}$ and the slicer input vector $d^{(k)}$. It includes a transposed conjugator 805, a phase estimator 810, a polarization angle estimator 820, and a rotation matrix calculator 830. The transpose conjugator 805 computes the conjugate transpose of the thresholded rotated vector $\bar{a}^{(k)}$. The phase estimator 810 estimates the phase angle vector for each polarization ($\hat{\Phi}^{(k+1)} = (\hat{\phi}_x^{(k+1)}, \hat{\phi}_y^{(k+1)})$) from $(\bar{a}^{(k)})^H$ and $d^{(k)}$. It includes a phase angle calculator 812, a loop filter 814, an adder 816, and a delay element 818. The polarization angle estimator 820 estimates the polarization angle $\hat{\theta}^{(k+1)}$ from $(\bar{a}^{(k)})^H$ and $d^{(k)}$. It includes a polarization angle calculator 822, a loop filter 824, an adder 826, and a delay element 828. Usually, the polarization angle of the transmitted laser and local oscillator varies in time. When these variations are slow, the adaptive equalizer can track the polarization rotation. However, fast changes in the polarization angle could not be tracked and performance degrades. To avoid this problem, an estimator of the rotation angle may be used, in a similar way to the phase noise case.

The phase angle calculator 812 calculates the phase angle vector $\phi^{(k)} = (\phi_x^{(k)}, \phi_y^{(k)})$. The polarization angle calculator 822 calculates the polarization angle $\kappa^{(k)}$. The derivations of $\phi^{(k)}$ and $\kappa^{(k)}$ are given below.

The vector $d^{(k)}$ can be viewed as a rotated version of $\bar{a}^{(k)}$:

$$d^{(k)} = \begin{bmatrix} c_x & 0 \\ 0 & c_y \end{bmatrix} \begin{bmatrix} \exp(j\varphi_x^{(k)}) & 0 \\ 0 & \exp(j\varphi_y^{(k)}) \end{bmatrix} \begin{bmatrix} \cos(\kappa^{(k)}) & -\sin(\kappa^{(k)}) \\ \sin(\kappa^{(k)}) & \cos(\kappa^{(k)}) \end{bmatrix} \bar{a}^{(k)} \quad (26)$$

$$d^{(k)} = \begin{bmatrix} c_x \cos(\kappa^{(k)}) \exp(j\varphi_x^{(k)}) & -c_x \sin(\kappa^{(k)}) \exp(j\varphi_x^{(k)}) \\ c_y \sin(\kappa^{(k)}) \exp(j\varphi_y^{(k)}) & c_y \cos(\kappa^{(k)}) \exp(j\varphi_y^{(k)}) \end{bmatrix} \bar{a}^{(k)} \quad (27)$$

$$d^{(k)} = \begin{bmatrix} c_x \cos(\kappa^{(k)}) \exp(j\varphi_x^{(k)}) \bar{a}_x^{(k)} & -c_x \sin(\kappa^{(k)}) \exp(j\varphi_x^{(k)}) \bar{a}_y^{(k)} \\ c_y \sin(\kappa^{(k)}) \exp(j\varphi_y^{(k)}) \bar{a}_x^{(k)} & +c_y \cos(\kappa^{(k)}) \exp(j\varphi_y^{(k)}) \bar{a}_y^{(k)} \end{bmatrix}, \quad (28)$$

where $c_x$ and $c_y$ are factors introduced to allow for the possibility of independent gain error for each polarization state.

Using the last $N_\kappa$ symbol intervals, the average value of $d^{(k)}(\bar{a}^{(k)})^H$ may be computed as:

$$M_\kappa^{(k)} = \begin{bmatrix} M_{\kappa 11}^{(k)} & M_{\kappa 12}^{(k)} \\ M_{\kappa 21}^{(k)} & M_{\kappa 22}^{(k)} \end{bmatrix} \quad (29)$$

$$= \frac{1}{N_\kappa} \sum_{l=0}^{N_\kappa - 1} \{d^{(k-1)}(\bar{a}^{(k-1)})^H\}$$

$$\cong \begin{bmatrix} c_x B_\kappa^{(k)} \cos(\kappa^{(k)}) \frac{1}{N_\kappa} \sum_{l=0}^{N_\kappa - 1} \exp(j\varphi_x^{(k-1)}) & -c_x B_\kappa^{(k)} \sin(\kappa^{(k)}) \sum_{l=0}^{N_\kappa - 1} \exp(j\varphi_x^{(k-1)}) \\ c_y B_\kappa^{(k)} \sin(\kappa^{(k)}) \frac{1}{N_\kappa} \sum_{l=0}^{N_\kappa - 1} \exp(j\varphi_y^{(k-1)}) & c_y B_\kappa^{(k)} \cos(\kappa^{(k)}) \frac{1}{N_\kappa} \sum_{l=0}^{N_\kappa - 1} \exp(j\varphi_y^{(k-1)}) \end{bmatrix},$$

-continued where $B_\kappa^{(k)} = \frac{1}{N_\kappa} \sum_{l=0}^{N_\kappa-1} |\overline{a}_x^{(k-1)}|^2$ assuming $\sum_{l=0}^{N_\kappa-1} |\overline{a}_x^{(k-1)}|^2 \cong \sum_{l=0}^{N_\kappa-1} |\overline{a}_y^{(k-1)}|^2$ (31)

Parameter $N_\kappa$ is selected large enough to remove cross-terms appearing in $$\frac{1}{N_\kappa} \sum_{l=0}^{N_\kappa-1} \{d^{(k-1)}(\overline{a}^{(k-1)})^H\},$$

and sufficiently small so that the polarization angle $\kappa^{(k)}$ can be considered constant over the interval of length $N_\kappa$.

Then, from matrix $M_\kappa^{(k)}$ the angle $\kappa^{(k)}$ may be computed as follow:

$$\kappa^{(k)} = \frac{1}{2}(\kappa_1^{(k)} + \kappa_2^{(k)}),$$ (32)

$$\kappa_1^{(k)} = \arctan(M_{\kappa 21}^{(k)} / M_{\kappa 22}^{(k)}),$$

$$\kappa_2^{(k)} = \arctan(-M_{\kappa 11}^{(k)} / M_{\kappa 12}^{(k)}).$$

Similarly, by selecting a proper value for the period $N_\varphi$, it is possible to obtain phases $\phi_x^{(k)}$ and $\phi_y^{(k)}$ as:

$$\varphi_x^{(k)} = \frac{1}{2}\text{angle}((M_{\varphi 11}^{(k)})^2 + (M_{\varphi 12}^{(k)})^2)$$ (33)

$$\varphi_y^{(k)} = \frac{1}{2}\text{angle}((M_{\varphi 21}^{(k)})^2 + (M_{\varphi 22}^{(k)})^2),$$

where $$M_\varphi^{(k)} = \begin{bmatrix} M_{\varphi 11}^{(k)} & M_{\varphi 12}^{(k)} \\ M_{\varphi 21}^{(k)} & M_{\varphi 22}^{(k)} \end{bmatrix}$$ (34)

$$= \frac{1}{N_\varphi} \sum_{l=0}^{N_\varphi-1} \{d^{(k-1)}(\overline{a}^{(k-1)})^H\}$$

$$\cong \begin{bmatrix} c_x B_\varphi^{(k)} \cos(\kappa^{(k)}) \exp(j\varphi_x^{(k)}) & -c_x B_\varphi^{(k)} \sin(\kappa^{(k)}) \exp(j\varphi_x^{(k)}) \\ c_y B_\varphi^{(k)} \sin(\kappa^{(k)}) \exp(j\varphi_y^{(k)}) & c_y B_\varphi^{(k)} \cos(\kappa^{(k)}) \exp(j\varphi_y^{(k)}) \end{bmatrix}$$

where $B_\varphi^{(k)} = \frac{1}{N_\varphi} \sum_{l=0}^{N_\varphi-1} |\overline{a}_x^{(k-1)}|^2,$ (35)

assuming $\frac{1}{N_\varphi} \sum_{l=0}^{N_\varphi-1} |\overline{a}_x^{(k-1)}|^2 \cong \frac{1}{N_\varphi} \sum_{l=0}^{N_\varphi-1} |\overline{a}_y^{(k-1)}|^2$ (36)

In general, the value of $N_\varphi$ is smaller than $N_\kappa$ owing to the nature of the phase noise, which changes faster than the polarization angle. However, this reduction of the averaging window may enhance noise effects on the estimates. Nevertheless, this effect is significantly reduced when the polarization rotation is accurately tracked ($|\kappa^{(k)}| \to 0$).

The loop filters 814 and 824 have impulse response $\tilde{s}_\phi^{(k)} = (f_{\phi,x}^{(k)}, f_{\phi,y}^{(k)})$ and $f_\theta^{(k)}$ to provide dynamics to the phase estimator 810 and polarization angle estimator 820, respectively. The adders 816 and 826 add the delayed estimates provided by the delay elements 816 and 826 to the respective filter outputs to generate the phase and polarization estimates, respectively, as follows $\hat{\phi}_x^{(k+1)} = \hat{\phi}_x^{(k)} + f_{\phi,x}^{(k)} \otimes \phi_x^{(k)},$ (37)

$\hat{\phi}_y^{(k+1)} = \hat{\phi}_y^{(k)} + f_{\phi,y}^{(k)} \otimes \phi_y^{(k)},$ $\hat{\theta}^{(k+1)} = \hat{\theta}^{(k)} + f_\theta^{(k)} \otimes \kappa^{(k)},$ (38)

where $\otimes$ denotes convolution sum.

The rotation matrix calculator 830 generates the phase and polarization matrix $A^{(k+1)}$ using the $\hat{\Phi}^{(k+1)}$ and $\hat{\theta}^{(k+1)}$ computed in equations (37) and (38) as follows:

$$A^{(k)} = \begin{bmatrix} \exp(-j\hat{\phi}_x^{(k)}) & 0 \\ 0 & \exp(-j\hat{\phi}_y^{(k)}) \end{bmatrix} \begin{bmatrix} \cos\hat{\theta}^{(k)} & \sin\hat{\theta}^{(k)} \\ -\sin\hat{\theta}^{(k)} & \cos\hat{\theta}^{(k)} \end{bmatrix}$$ (39)

$$= \begin{bmatrix} \cos\hat{\theta}^{(k)} \exp(-j\hat{\phi}_x^{(k)}) & \sin\hat{\theta}^{(k)} \exp(-j\hat{\phi}_x^{(k)}) \\ -\sin\hat{\theta}^{(k)} \exp(-j\hat{\phi}_y^{(k)}) & \cos\hat{\theta}^{(k)} \exp(-j\hat{\phi}_y^{(k)}) \end{bmatrix}$$

The loop filters 814 and 824 may be implemented by a number of methods such as proportional, proportional plus integral, proportional plus integral plus derivative, or any other suitable filtering techniques.

Figure 9B:
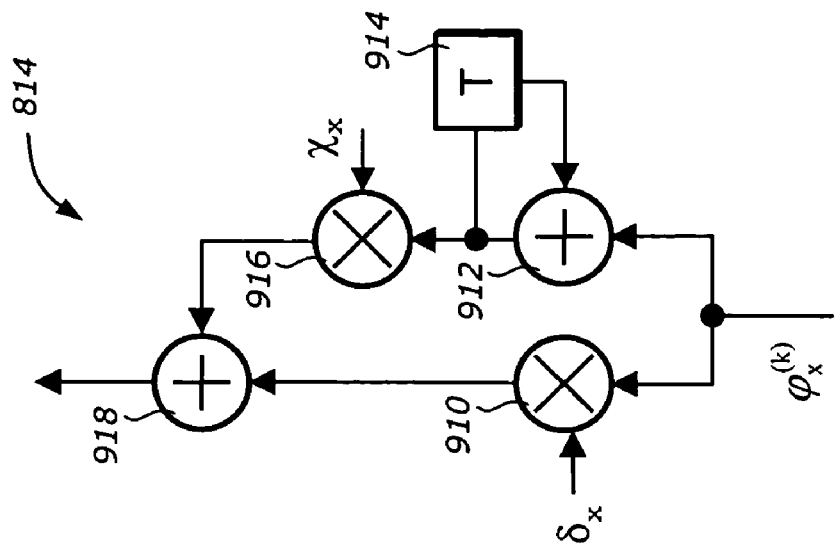
FIG. 9B is a diagram illustrating the loop filter using a proportional plus integral filtering in the phase estimator according to one embodiment of the invention
Figure 9A:
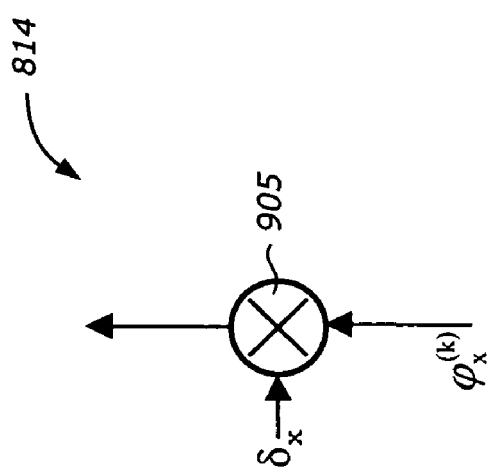
FIG. 9A is a diagram illustrating the loop filter using a proportional filtering in the phase estimator according to one embodiment of the invention.

FIG. 9A is a diagram illustrating the loop filter 814 using a proportional filtering in the phase estimator according to one embodiment of the invention. It includes a multiplier 905. The multiplier 910 multiplies the phase angle ($\phi_x^{(k)}, \phi_y^{(k)}$) with filter coefficients or filter gains, $\delta_x$ and $\delta_y$, respectively. The Z-transforms of $f_{\phi,x}^{(k)}$ and $f_{\phi,y}^{(k)}$ are:

$F_{\phi,x}(z) = \delta_x$ $F_{\phi,y}(z) = \delta_y$ (40)

FIG. 9B is a diagram illustrating the loop filter 814 using a proportional plus integral filtering in the phase estimator according to one embodiment of the invention. It includes a multiplier 910, an adder 912, a delay element 914, a multiplier 916, and an adder 918.

The Z-transform of $f_{\phi,x}^{(k)}$ and $f_{\phi,y}^{(k)}$ are:

$$F_{\phi,x}(z) = \delta_x + \frac{\chi_x}{1 - z^{-1}},$$ (41)

$$F_{\phi,y}(z) = \delta_y + \frac{\chi_y}{1 - z^{-1}},$$

where, $\delta_x, \gamma_y, \chi_x$ and $\chi_y$ are filter coefficients.

Figures 10A, 10B:
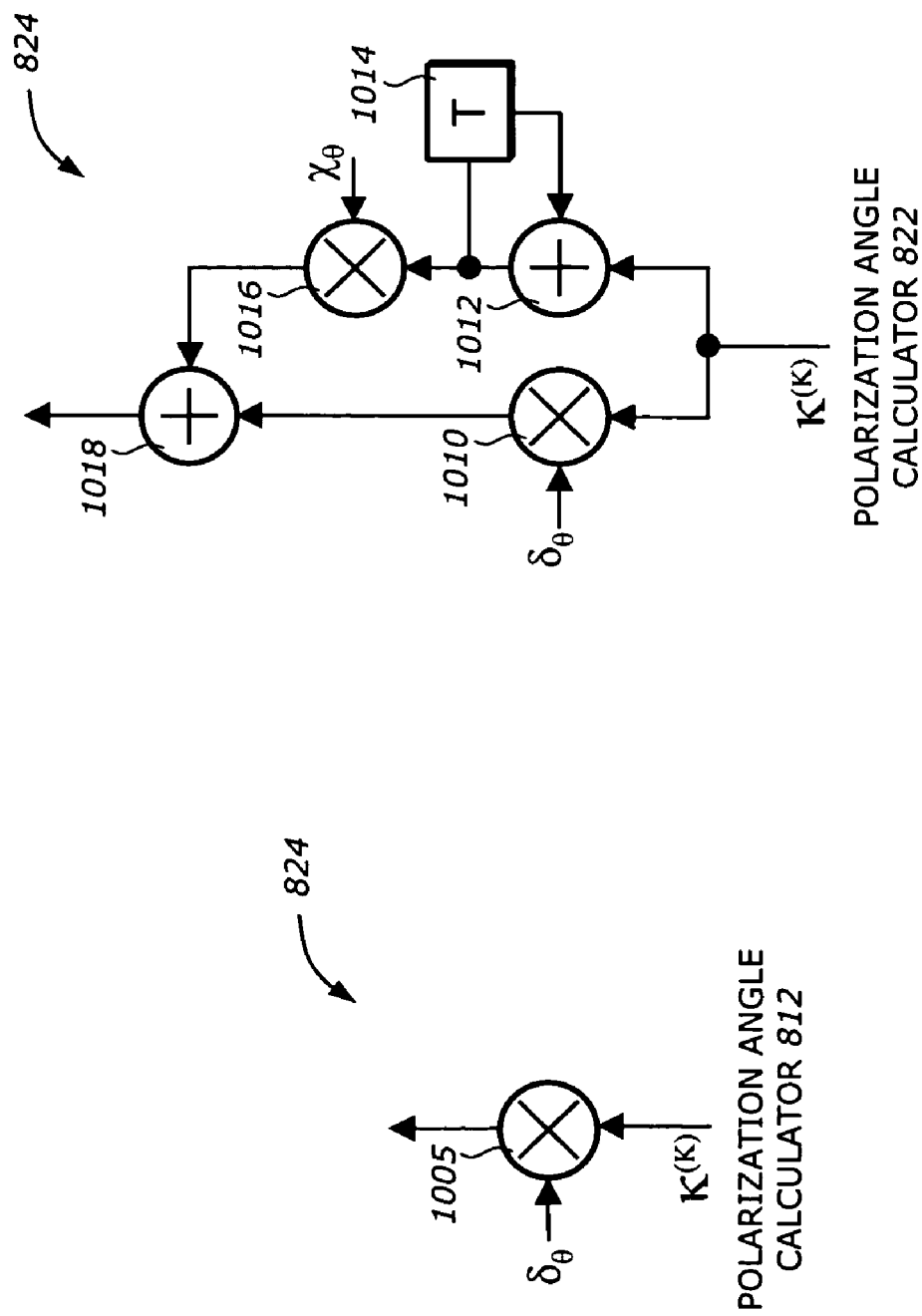
FIG. 10A is a diagram illustrating the loop filter using a proportional filtering in the polarization angle estimator according to one embodiment of the invention.
FIG. 10B is a diagram illustrating the loop filter using a proportional plus integral filtering in the polarization angle estimator according to one embodiment of the invention

FIG. 10A is a diagram illustrating the loop filter 824 using a proportional filtering in the polarization angle estimator according to one embodiment of the invention. It includes a multiplier 1005. The multiplier 1005 multiplies the polarization angle $\kappa^{(k)}$ with a filter coefficient, or gain, $\delta_\theta$. The Z-transform of $f_\theta^{(k)}$ is:

$F_\theta(z) = \delta_\theta.$ (42)

FIG. 10B is a diagram illustrating the loop filter 814 using a proportional plus integral filtering in the polarization angle estimator according to one embodiment of the invention. It includes a multiplier 1010, an adder 1012, a delay element 1014, a multiplier 1016, and an adder 1018. The Z-transform of $f_\theta^{(k)}$ is:

$$F_\theta(z) = \delta_\theta + \frac{\chi_\theta}{1 - z^{-1}}, \qquad (43)$$

where $\delta_\theta$ and $\chi_\theta$ are filter coefficients.

One embodiment of the present invention is simulated using a symbol rate of 10 GBauds and a data rate of 40 Gb/s. The simulation uses a typical single mode fiber as specified by the International Telecommunication Union (ITU) G.652 Recommendation used in the third telecommunication window (1550 mn) which leads to a dispersion parameter D=17 ps/km/nm. The PMD is set at 10 ps/$\sqrt{km}$. The fiber is modeled using the coarse step method, with more than 100 sections of birefringent fiber. This adequately models first- and higher order PMD as well as CD.

The signal-to-noise ratio (SNR) is defined as 10 log10 ($E_b/N_0$) dB where $N_0$ is the total noise variance given by the sum of ASE, shot, and thermal noise variance. $E_b$ is the mean received energy per bit. The phase noise parameter is $\Delta v\, T$. Two polarization multiplexed QDPSK constellations at a signaling rate of 10 GBauds are used. The transmitter pulse shape is Gaussian with a full width at half maximum $T_{FWHM}$=60 ps.

The results when the phase noise parameter is set to zero are as follows. An 8-tap equalizer is sufficient to compensate up to 200 km of fiber with about 1 dB penalty. A 10-tap equalizer can reach 250 km, and a 15-tap equalizer can compensate more than 300 km. With a channel length of 300 km and a 15-tap equalizer, the system can handle up to 20 MHz of laser phase noise with a penalty of less than 3 dB for a constant bit error arte (BER) of $10^{-6}$. In general, the equalizer can compensate channel dispersion of up to 1000 km of single mode fiber, with less than 3 dB penalty in SNR. These numerical results are shown only to show the efficiency of the equalizer for certain system parameters. They are not definitive values or theoretical limits and are not intended to limit other results in other system parameters and configurations.

Thus, one embodiment of the present invention offers a number of advantages over prior art techniques: (1) long distances may be efficiency compensated with existing technology, (2) feasibility of using VLSI implementation for the receivers, (3) the technique is suitable for both analog and digital implementation.

The embodiments described in the invention use DQPSK modulation on each axis of polarization. However, the receiver can decode simpler modulation formats, such as the intensity modulation. The receiver could be used to detect signals generated by conventional intensity modulated transmitters. Of course the data rate would be reduced accordingly, but the advantage is that the customer does not need to upgrade both sides (transmit and receive) at the same time. The customer may upgrade only the receiver initially, and continue to operate at the same data rate as before the upgrade. Later the customer may upgrade the transmitter and quadruple the data rate. The receiver is also backward compatible with DQPSK without polarization modulation, DBPSK with or without polarization modulation, amplitude shift keying (ASK) with or without polarization modulation, etc.

One embodiment of the present invention can be implemented by digital signal processing, analog signal processing or a mixed-mode signal processing. Digital signal processing includes, but is not limited to, digital signal processors (DSPs), programmable devices such as complex programmable logic devices (CPLDs), field programmable gate arrays (FPGAs), etc., and custom integrated circuits in technologies like, for example, complementary metal oxide semiconductor (CMOS).

Several embodiments of the present invention are available. The embodiment presented above is the multidimensional linear equalizer. Other embodiments include, but are not limited to, soft-input/soft-output (SISO) multidimensional transversal filter equalizers (SISO-MTFE), turbo (iterative) multidimensional transversal filter equalizer (T-MTFE), multidimensional decision feedback equalizers (DFE), and multidimensional maximum likelihood sequence estimators (MLSE).

Figure 11A:
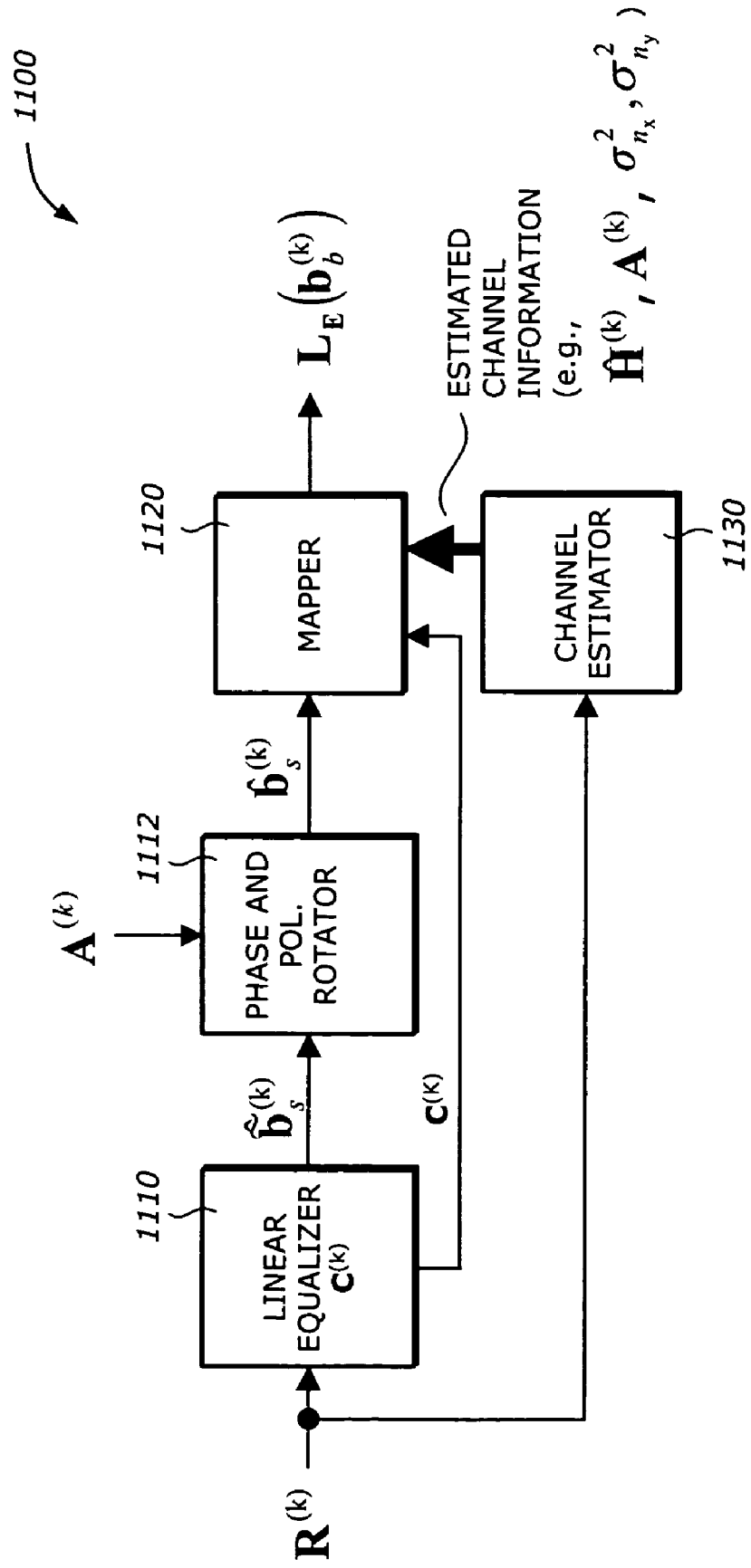
FIG. 11A is a diagram illustrating a SISO-MTFE according to one embodiment of the invention.

FIG. 11A is a diagram illustrating a SISO-MTFE 1100 according to one embodiment of the invention. The SISO-MTFE 1100 includes a linear equalizer 1110, a rotator 1112, a mapper 1120, and a channel estimator 1130.

Let $b_{b,x}^{(k)}(b_{b,y}^{(k)})$ be a set of bits (e.g., the output of channel codes) that is mapped to a symbol $b_{s,x}^{(k)}(b_{s,y}^{(k)})$ (e.g., $b_{b,x}^{(k)} \in \{(00)(01)(10)(11)\}$ and $b_{s,x}^{(k)} \in \{(1+\sqrt{-1})/\sqrt{2}, (1-\sqrt{-1})/\sqrt{2}, (-1+\sqrt{-1})/\sqrt{2}, (-1-\sqrt{-1})/\sqrt{2}\}$ for QAM). Let $C^{(k)}$ be the matrix of equalizer coefficients defined by:

$$C^{(k)} = \begin{bmatrix} c_{11}^{(k)} & c_{12}^{(k)} \\ c_{21}^{(k)} & c_{22}^{(k)} \end{bmatrix}, \qquad (44)$$

where $c_{ij}^{(k)}$ is an $L_c \times 1$ vector coefficient defined by $$c_{ij}^{(k)} = [c_{ij}^{(k)(-N_1)} c_{ij}^{(k)(-N_1+1)} \ldots c_{ij}^{(k)(N_2)}]^{T_r},\, i,j=1,2, \qquad (45)$$

with $L_c = N_1 + N_2 + 1$ ($T_r$ denotes transpose). Vector coefficients $c_{ij}^{(k)}$ may be designed by using any of several methods such as MMSE.

For consistency with other notations, the following notations may be defined. $H_{ij}^{(k)}$ the $L_c \times (L_c + L_h - 1)$ (i,j)-th (baud rate) channel convolution matrix given by:

$$H_{ij}^{(k)} = \begin{bmatrix} h_{ij}^{(k)(L_h-1)} & h_{ij}^{(k)(L_h-2)} & \cdots & h_{ij}^{(k)(0)} & 0 & 0 & \cdots & 0 \\ 0 & h_{ij}^{(k)(L_h-1)} & \cdots & h_{ij}^{(k)(1)} & h_{ij}^{(k)(0)} & 0 & \cdots & 0 \\ & & \ddots & & & & & \\ 0 & 0 & \cdots & h_{ij}^{(k)(L_h-1)} & h_{ij}^{(k)(L_h-2)} & \cdots & h_{ij}^{(k)(1)} & h_{ij}^{(k)(0)} \end{bmatrix} \qquad (46)$$

$$i, j = 1, 2,$$

where $[h_{ij}^{(k)(0)}, h_{ij}^{(k)(1)}, \ldots, h_{ij}^{(k)(L_h-1)}]$ is the impulse response of the (i,j)-th channel of length $L_h$.

$B_{s,x}^{(k)}$ and $B_{s,y}^{(k)}$ are $(L_c+L_h-1)\times 1$ dimensional transmitted symbol vectors given by:

$$B_{s,i}^{(k)}=[b_{s,i}^{(k-L_h-N_2+1)} b_{s,i}^{(k-L_h N_2+2)} \ldots b_{s,i}^{(k+N_1)}]^{T_r} \quad i=x,y. \tag{47}$$

$N_x^{(k)}$ and $N_y^{(k)}$ are $L_c \times 1$ dimensional noise vectors given by:

$$N_i^{(k)}=[n_i^{k-N_2} n_i^{(k-N_2+1)} \ldots n_i^{(k+N_1)}]^{T_r} \quad i=x,y. \tag{48}$$

$\Phi^{(k)}$ is the $2L_c \times 2L_c$ diagonal phase rotation matrix defined by:

$$\Phi^{(k)} \times \mathrm{Diag}[e^{j\phi_x^{(k-N_2)}} e^{j\phi_x^{(k-N_2+1)}} \ldots e^{j\phi_x^{(k+N_1)}} e^{j\phi_y^{k-N_2}} \\ e^{j\phi_y^{(k-N_2+1)}} \ldots e^{j\phi_y^{(k+N_1)}}]. \tag{49}$$

$\hat{R}_x^{(k)}$ and $\hat{R}_y^{(k)}$ are $L_c \times 1$ dimensional received sample vectors with no polarization rotation given by $$\hat{R}_i^{(k)}=[\hat{r}_i^{(k-N_2)} \hat{r}_i^{(k-N_2+1)} \ldots \hat{r}_i^{(k+N_1)}]^{T_r} \quad i=x,y. \tag{50}$$

The multidimensional received samples vector with no polarization rotation, $\hat{R}^{(k)}$, can be expressed as $$\hat{R}^{(k)} = \begin{bmatrix} \hat{R}_x^{(k)} \\ \hat{R}_y^{(k)} \end{bmatrix} = \Phi^{(k)} H^{(k)} B_s^{(k)} + N^{(k)}, \tag{51}$$

where $H^{(k)}$, $B_s^{(k)}$, and $N^{(k)}$ are the multidimensional channel convolution matrix, symbol vector, and noise vector defined respectively by $$H^{(k)} = \begin{bmatrix} H_{11}^{(k)} & H_{12}^{(k)} \\ H_{21}^{(k)} & H_{22}^{(k)} \end{bmatrix}, \tag{52}$$

$$B_s^{(k)} = \begin{bmatrix} B_{s,x}^{(k)} \\ B_{s,y}^{(k)} \end{bmatrix}, \tag{53}$$

$$N^{(k)} = \begin{bmatrix} N_x^{(k)} \\ N_y^{(k)} \end{bmatrix}. \tag{54}$$

$R_x^{(k)}$ and $R_y^{(k)}$ are $L_c \times 1$ dimensional received sample vectors including polarization rotation given by $$R_i^{(k)}=[r_i^{(k-N_2)} r_i^{(k-N_2+1)} \ldots r_i^{(k+N_1)}]^{T_r} \quad i=x,y. \tag{55}$$

Elements of $R_x^{(k)}$ and $R_y^{(k)}$ can be obtained from the elements of $\hat{R}_x^{(k)}$ and $\hat{R}_y^{(k)}$ as $$\begin{bmatrix} r_x^{(k)} \\ r_y^{(k)} \end{bmatrix} = \begin{bmatrix} \cos(\theta^{(k)}) & -\sin(\theta^{(k)}) \\ \sin(\theta^{(k)}) & \cos(\theta^{(k)}) \end{bmatrix} \begin{bmatrix} \hat{r}_x^{(k)} \\ \hat{r}_y^{(k)} \end{bmatrix}. \tag{56}$$

The linear equalizer 1110 equalizes the received sample vector $$R^{(k)} = \begin{bmatrix} R_x^{(k)} \\ R_y^{(k)} \end{bmatrix}$$

using a matrix equalizer coefficients $C^{(k)}$ as follows:

$$\hat{\tilde{b}}_s^{(k)} = \begin{bmatrix} \hat{\tilde{b}}_{s,x}^{(k)} \\ \hat{\tilde{b}}_{s,y}^{(k)} \end{bmatrix} = (C^{(k)})^H R^{(k)}, \tag{57}$$

where $^H$ denotes transpose conjugate.

The output sample $\hat{\tilde{b}}_s^{(k)}$ is rotated by the phase and polarization rotator 1112 to obtain the estimate of the transmitted symbol $$\hat{b}_s^{(k)} = \begin{bmatrix} \hat{b}_{s,x}^{(k)} \\ \hat{b}_{s,y}^{(k)} \end{bmatrix},$$

which is denoted by $$\hat{b}_s^{(k)} = \begin{bmatrix} \hat{b}_{s,x}^{(k)} \\ \hat{b}_{s,y}^{(k)} \end{bmatrix}.$$

The mapper 1120 processes $\hat{b}_s^{(k)}$ to provide the soft-output $L_E(b_b^{(k)})$. For example, assuming that $\hat{b}_s^{(k)}$ is Gaussian and BPSK modulation ($b_{s,i}^{(k)}=\pm 1$, $i=x,y$) the mapper yields:

$$L_E = (b_b^{(k)}) = \begin{bmatrix} 2\frac{\mu_{x,+1}^{(k)}}{(\sigma_x^{(k)})^2} \mathrm{Re}\{\hat{b}_{s,x}^{(k)}\} \\ 2\frac{\mu_{y,+1}^{(k)}}{(\sigma_y^{(k)})^2} \mathrm{Re}\{\hat{b}_{s,y}^{(k)}\} \end{bmatrix}, \tag{58}$$

where $\mu_{x,+1}^{(k)}(\mu_{y,+1}^{(k)})$ and $(\sigma_x^{(k)})^2((\sigma_y^{(k)})^2)$ are the mean and variance of the received signal component x(y) for $b_{s,x}^{(k)}=+1$ ($b_{s,y}^{(k)}=+1$).

In one embodiment, these parameters are estimated from the filter coefficients matrix $C^{(k)}$ and the information provided by the channel estimator 1130. The channel estimator 1130 provides estimates of the channel response $H^{(k)}$, the phase and polarization rotation matrix $A^{(k)}$, and noise powers $\sigma_{n_x}^2$ and $\sigma_{n_y}^2$.

Figure 11B:
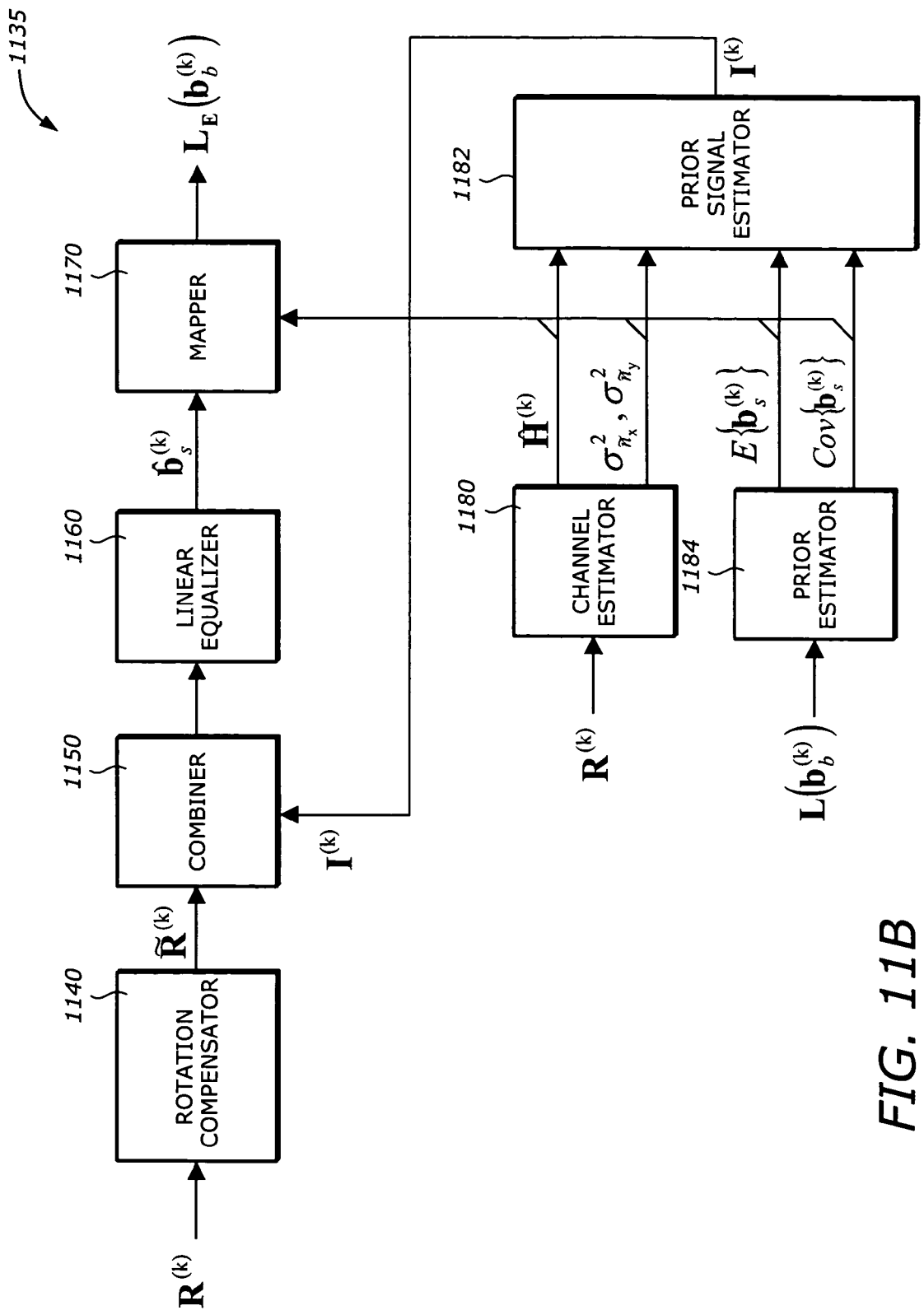
FIG. 11B is a diagram illustrating a T-MTFE according to one embodiment of the invention.

FIG. 11B is a diagram illustrating a T-MTFE 1135 according to one embodiment of the invention. The T-MTFE 1135 is one embodiment of the T-MTFE working at baud rate and is derived from the MMSE criterion. The T-MTFE 1135 includes a rotation compensator 1140, a combiner 1150, a linear equalizer 1160, a mapper 1170, a channel estimator 1180, a prior estimator 1184, and a prior signal estimator 1182.

In the present invention, phase and polarization rotation may be compensated after or before equalization as discussed earlier. Although in general, rotation before equalization may achieve worse performance due to the bandwidth reduction of the tracking loop, it can be used to compensate phase and polarization rotation with reasonable accuracy. The T-MTFE provides (iteratively) soft-outputs $L_E(b_b^{(k)})=[L_E(b_{b,x}^{(k)}) L_E(b_{b,y}^{(k)})]^{T_r}$ based on the received samples and the a priori information $L(b_b^{(k)})=[L(b_{b,x}^{(k)}) L(b_{b,y}^{(k)})]^{T_r}$ provided by channel decoders. The use of a priori information $L(b_b^{(k)})$ improves the reliability of the equalizer soft-outputs. The reliabilities $L(b_b^{(k)})$ and $L_E(b_b^{(k)})$ improve with the iteration number. This way, performance also improves with the iteration number.

The vector signal at the output of the phase and polarization rotation compensator 1140 can be expressed as $$\tilde{R}^{(k)} = \begin{bmatrix} \tilde{R}_x^{(k)} \\ \tilde{R}_y^{(k)} \end{bmatrix} = H^{(k)} B_s^{(k)} + \tilde{N}^{(k)}, \quad (59)$$

where $$\tilde{N}^{(k)} = \begin{bmatrix} \tilde{N}_x^{(k)} \\ \tilde{N}_y^{(k)} \end{bmatrix}$$

with $\tilde{N}_i^{(k)} = [\tilde{n}_i^{(k-N_2)} \tilde{n}_i^{(k-N_2+1)} \ldots \tilde{n}_i^{(k+N_1)}]^{T_r}$ i=x, y, is the noise component vector at the output of the rotation compensator 1140.

In one embodiment, the outputs of a baud rate equalizer 1160 for a given iteration are calculated as $$\hat{b}_s^{(k)} = (C^{(k)})^H [\tilde{R}^{(k)} - I^{(k)}], \quad (60)$$

where $$C^{(k)} = \begin{bmatrix} c_{11}^{(k)} & c_{12}^{(k)} \\ c_{21}^{(k)} & c_{22}^{(k)} \end{bmatrix}$$

is the filter coefficient matrix and $$\hat{b}_s^{(k)} = \begin{bmatrix} \hat{b}_{s,x}^{(k)} \\ \hat{b}_{s,y}^{(k)} \end{bmatrix}.$$

Vector $I^{(k)}$ is updated in each iteration by the prior signal estimator 1182:

$$I^{(k)} = H^{(k)} E\{B_s^{(k)}\} - S^{(k)} E\{b_s^{(k)}\}, \text{ where} \quad (61)$$

$$S^{(k)} = \begin{bmatrix} s_{11}^{(k)} & s_{12}^{(k)} \\ s_{21}^{(k)} & s_{22}^{(k)} \end{bmatrix}, \quad (62)$$

$$s_{ij}^{(k)} = H_{ij}^{(k)} [0_{1\times(N_2+L_h-1)} \quad 1 \quad 0_{1\times N_1}]^{T_r} i, j = 1, 2. \quad (63)$$

In one embodiment, the estimates $\hat{H}_{ij}^{(k)}$ and $\hat{s}_{ij}^{(k)}$ (i,j=1,2) provided by the channel estimator 1180 are used instead of $H_{ij}^{(k)}$ and $s_{ij}^{(k)}$, respectively.

$$E\{B_s^{(k)}\} = \begin{bmatrix} E\{B_{s,x}^{(k)}\} \\ E\{B_{s,y}^{(k)}\} \end{bmatrix} \text{ and } E\{b_s^{(k)}\} = \begin{bmatrix} E\{b_{s,x}^{(k)}\} \\ E\{b_{s,y}^{(k)}\} \end{bmatrix}$$

are the mean values of the symbol vectors $B_s^{(k)}$ and $b_s^{(k)}$, respectively. $E\{b_{s,i}^{(k)}\}$ is the mean value of the symbol $b_{s,i}^{(k)}$, while vectors $E\{B_{s,i}^{(k)}\}$ i=x,y are defined by $E\{B_{s,i}^{(k)}\} = [E\{b_{s,i}^{(k-L_h-N_2+1)}\} E\{b_{s,i}^{(k-L_h-N_2+2)}\} \ldots E\{b_{s,i}^{(k+N_1)}\}]^{T_r}$.

$E\{b_s^{(k)}\}$ is updated in each iteration by the prior estimator 1184. In one embodiment, it is estimated using the a priori information on the occurrence probability of $b_b^{(k)}$ provided by the channel decoder, $L(b_b^{(k)})$. For example, for BPSK modulation ($b_{s,i}^{(k)} = \pm 1$, i=x,y), it may be obtained $$E\{b_s^{(k)}\} = \begin{bmatrix} \tanh(L(b_{b,x}^{(k)})/2) \\ \tanh(L(b_{b,y}^{(k)})/2) \end{bmatrix} \quad (64)$$

Vector coefficients $c_{ij}^{(k)}$ are in general time varying and depend on both the channel and a priori information provided by the channel decoder (i.e., in general they vary in each iteration). In turbo equalization, filter coefficients are designed to obtain equalizer outputs $\hat{b}_{s,x}^{(k)}$ and $\hat{b}_{s,y}^{(k)}$ independent from $L(b_{b,x}^{(k)})$ and $L(b_{b,y}^{(k)})$.

The mapper 1170 processes $$\hat{b}_s^{(k)} = \begin{bmatrix} \hat{b}_{s,x}^{(k)} \\ \hat{b}_{s,y}^{(k)} \end{bmatrix}$$

to provide the soft-output $L_E(b_b^{(k)})$. For example, assuming that $\hat{b}_s^{(k)}$ is Gaussian, for BPSK modulation ($b_{s,i}^{(k)} = \pm 1$, i=x,y) the mapper 1170 yields:

$$L_E(b_b^{(k)}) = \begin{bmatrix} 2\dfrac{\mu_{x,+1}^{(k)}}{(\sigma_x^{(k)})^2} \mathrm{Re}\{\hat{b}_{s,x}^{(k)}\} \\ 2\dfrac{\mu_{y,+1}^{(k)}}{(\sigma_y^{(k)})^2} \mathrm{Re}\{\hat{b}_{s,y}^{(k)}\} \end{bmatrix}, \quad (65)$$

where $\mu_{x,+1}^{(k)}$ ($\mu_{y,+1}^{(k)}$) and $(\sigma_x^{(k)})^2$ ($(\sigma_y^{(k)})^2$) are the mean and variance of the received signal component x(y) for $b_{s,x}^{(k)} = +1$ ($b_{s,y}^{(k)} = +1$), and $\mathrm{Re}\{.\}$ means real part.

In one embodiment, these parameters are estimated from the filter coefficient matrix $C^{(k)}$, the information provided by the channel estimator 1180 (i.e., $\hat{H}^{(k)}$ and noise powers $\sigma_{\tilde{n}_x}^2$ and $\sigma_{\tilde{n}_y}^2$), and the information provided the prior estimator 1184: $E\{b_s^{(k)}\}$ and $$Cov\{b_s^{(k)}\} = \begin{bmatrix} Cov\{b_{s,x}^{(k)} b_{s,x}^{(k)}\} \\ Cov\{b_{s,y}^{(k)} b_{s,y}^{(k)}\} \end{bmatrix}$$

with $Cov\{b_{s,i}^{(k)} b_{s,i}^{(k)}\} = 1 - |E\{b_{s,i}^{(k)}\}|^2$ i=x,y for BPSK modulation.

Figure 12:
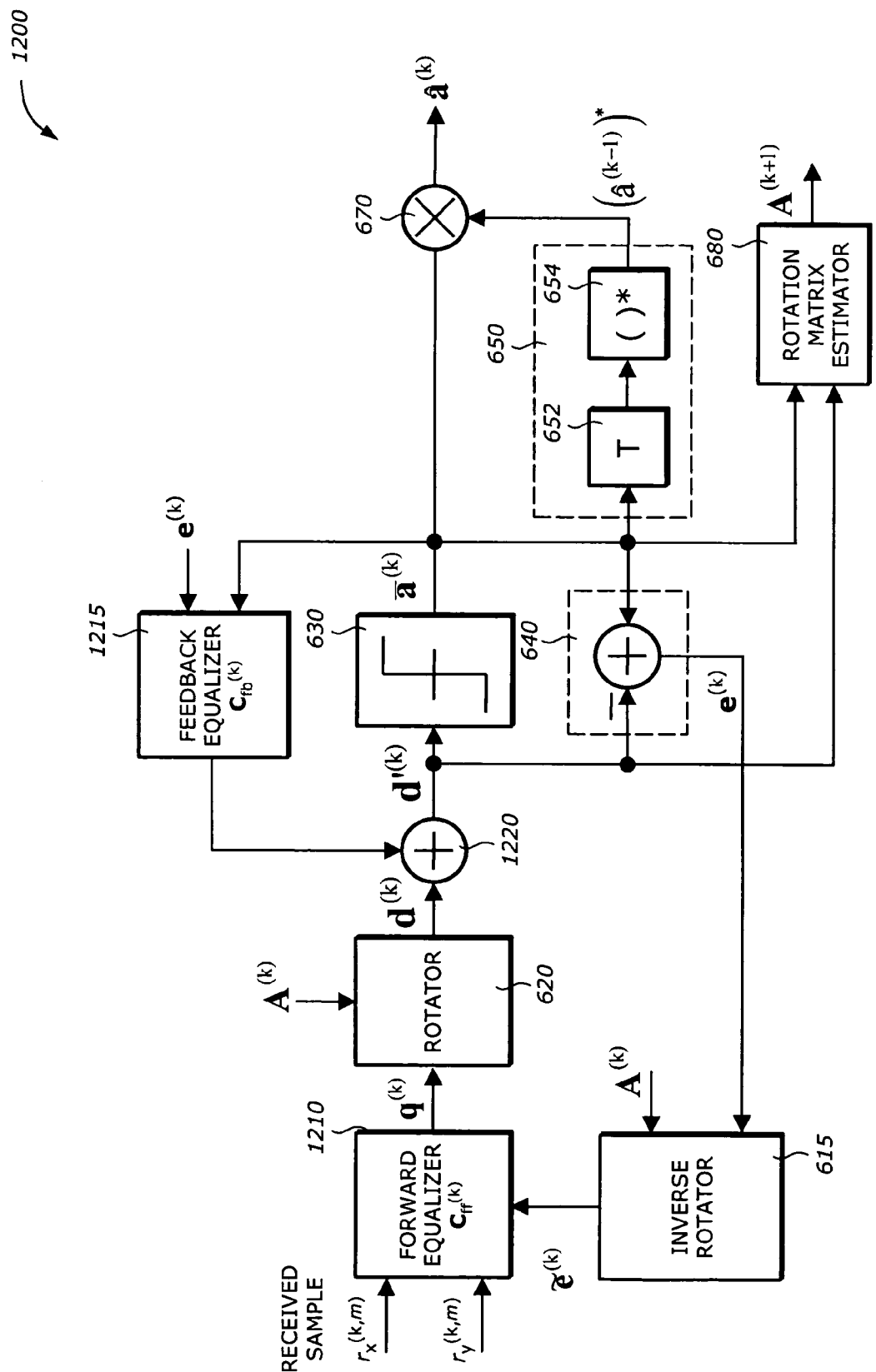
FIG. 12 is a diagram illustrating a DFE according to one embodiment of the invention.

FIG. 12 is a diagram illustrating a DFE 1200 according to one embodiment of the invention. The DFE 1200 includes a feed forward equalizer 1210, an inverse rotator 615, a rotator 620, an adder 1220, a feedback equalizer 1215, a slicer 630, an error calculator 640, a delay conjugator 650, a multiplier 670, and a rotation matrix estimator 680.

The inverse rotator 615, the rotator 620, the slicer 630, the error calculator 640, the delay conjugator 650, the multiplier 670, and the rotation matrix estimator 680 are similar to the respective elements shown in FIG. 6.

The output of the feed forward equalizer 1210 is rotated by the rotator 620 and is added to the multidimensional feedback equalizer 1215 by the adder 1220 to provide the equalized samples d'$^{(k)}$:

$$d'^{(k)}_x = d^{(k)}_x + \sum_{n=0}^{L_{cfb}-1} c^{(n)}_{fb11} \bar{a}^{(k \cdot n)}_x + \sum_{n=0}^{L_{cfb}-1} c^{(n)}_{fb21} \bar{a}^{(k \cdot n)}_y \quad (66)$$

$$d'^{(k)}_y = d^{(k)}_y + \sum_{n=0}^{L_{cfb}-1} c^{(n)}_{fb12} \bar{a}^{(k \cdot n)}_x + \sum_{n=0}^{L_{cfb}-1} c^{(n)}_{fb22} \bar{a}^{(k \cdot n)}_y,$$

where $L_{cfb}$ is the number of coefficients of the feedback equalizer. The equalized signal d'$^{(k)}$ is thresholded by the thresholder 630 to obtain hard decisions for further decoding.

The adaptation process may be implemented by, but is not limited to, the minimum mean squared error criterion. In this case the coefficients of the feed forward equalizer 1210 and the coefficients of the feedback equalizer 1215 can be calculated, respectively, by:

$$C_{\!f\!f}^{(k+1,m)} = C_{\!f\!f}^{(k,m)} + \sigma_{\!f\!f} [R^{(k,m)}]^H [e^{(k)}]^{Tr},$$

$$C_{\!f\!b}^{(k+1)} = C_{\!f\!b}^{(k)} + \rho_{\!f\!b} [\alpha^{(k)}]^H [e^{(k)}]^{Tr}, \quad (67)$$

where $\rho_{\!f\!f}$ and $\rho_{\!f\!b}$ are the step parameters for each update equation, $\alpha^{(k)} = [\alpha_x^{(k)} \; \alpha_y^{(k)}]$, $\alpha_x^{(k)}$ and $\alpha_y^{(k)}$ are the $L_{cfb}$-dimensional row vectors with the hard decisions at the output of the thresholder 630 for the x and y polarization, respectively. The feed forward equalizer 1210 may work with fractionally spaced samples, the feedback equalizer 1215 may only work with samples at baud-rate.

Figure 13:
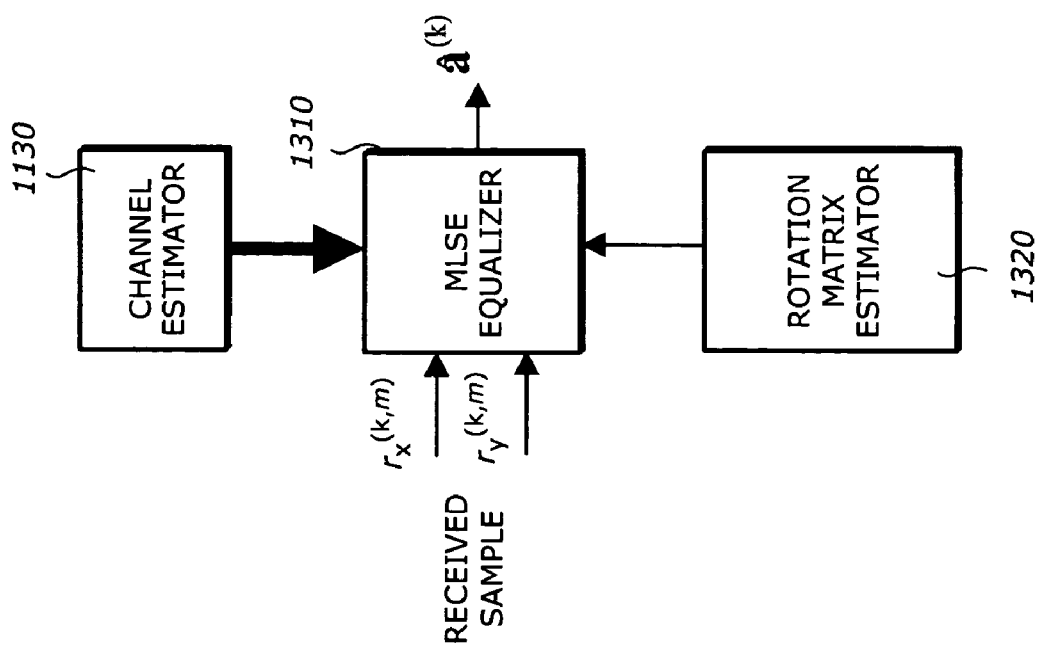
FIG. 13 is a diagram illustrating a maximum likelihood sequence estimation receiver (MLSE) receiver according to one embodiment of the invention

FIG. 13 is a diagram illustrating a maximum likelihood sequence estimation receiver (MLSE) receiver 1300 according to one embodiment of the invention. The MLSE receiver 1300 includes an MLSE equalizer 1310, a rotation matrix estimator 1320, and a channel estimator 1130.

The received multidimensional vector at the output of the RFE 150 is decoded by a multidimensional MLSE. The output of the multidimensional MLSE equalizer 1310 may be either hard or soft for further processing. The MLSE receiver can also compensate for nonlinear impairments appearing during fiber propagation. The MLSE receiver can also be used in conjunction with the previously developed multidimensional linear equalizer 600 as well as with a multidimensional decision feedback equalizer 1200.

Let N be the total number of symbols transmitted. The maximum likelihood sequence detector chooses, among all the possible sequences, the one that minimizes the metric $$m_r = \sum_{k=0}^{N-1} -\log(p(r^{(k)} | b^{(k)})), \quad (68)$$

where $p(r^{(k)}|b^{(k)})$ is the probability density function of the received signal conditioned to the transmitted sequence. The minimization can be efficiently implemented using, but not limited to, the Viterbi algorithm. When all the sources of noise are considered Gaussian, the branch metric computation is the Euclidean distance of the two four-dimensional vectors corresponding to the received signal and the possible received symbol. When there is no a priori information of the received signal statistics, the branch metric computation can be done by, but not limited to, estimating channel statistics.

The rotation matrix estimator 1320 may be the same as the phase and polarization rotation matrix estimator 680 shown in FIG. 6. Another embodiment of the present invention can use signal processing of the received signal to estimate the phase and polarization rotation matrix.

In another embodiment of the present invention, the Maximum Likelihood Sequence Estimator (MLSE) receiver 1300 is used in conjunction with the multidimensional linear equalizer 600. Such an embodiment can compensate for nonlinear channel distortions due to fiber nonlinearities. In this embodiment the multidimensional MLSE detector is fed with the output samples of the phase and polarization rotator 620.

In another embodiment of the present invention the MLSE receiver 1300 is used in conjunction with a multidimensional decision feedback equalizer 1200 to enhance performance. Such an embodiment can compensate for nonlinear channel distortions due to fiber nonlinearities. In this embodiment, the multidimensional MLSE detector is fed with the output samples of the phase and polarization rotator 620 of the DFE 1200 shown in FIG. 12.

Several other embodiments of the invention are envisioned. In one embodiment of the multidimensional linear equalizer, the adaptive transversal filters are implemented using parallel architectures in order to increase the processing speed. In one embodiment of the multidimensional decision feedback equalizer, the adaptive transversal filters are implemented using parallel architectures in order to increase the processing speed. In one embodiment of the multidimensional MLSE receiver, the decoding algorithm is implemented using parallel architectures of MLSE detectors. Such as, but not limited to, the sliding block Viterbi algorithm.

The present invention was presented above in the context of optical channels but it can be applied to any other multidimensional communication channels where a carrier is modulated to transmit symbols to a receiver through a channel with impairments for example, but not limited to, satellite downlinks where energy transfer from one orthogonal polarization to another arises due to said channel impairments.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
    an equalizer to equalize a multidimensional signal transmitted over a communication channel and having a dimensionality of four or higher, the equalizer being adaptively decision directed trained, the equalizer comprising a phase and polarization rotator to jointly rotate phase and polarization;
    wherein the equalizer produces soft outputs being used in soft channel decoding and iteratively produces outputs using a priori information provided by a channel decoder.

2. The apparatus of claim 1 wherein the equalizer is one of a linear equalizer, a decision-feedback equalizer, a Maximum Likelihood Sequence Estimator (MLSE) equalizer, and a combination of linear, decision-feedback, and MLSE equalizers.

3. The apparatus of claim 2 wherein the MLSE equalizer compensates linear and nonlinear distortions in the communication channel.

4. The apparatus of claim 2 wherein the MLSE equalizer compensates for non-gaussian noise.

5. An apparatus comprising:
an equalizer to equalize a multidimensional signal transmitted over a communication channel and having a dimensionality of four or higher, the equalizer being adaptively decision directed trained, the equalizer comprising a phase and polarization rotator to jointly rotate phase and polarization;
a phase estimator to estimate a phase angle vector; and
a polarization angle estimator to estimate a polarization angle.

6. The apparatus of claim 5 wherein the phase angle vector and the polarization angle are used to compensate different phase errors for each polarization, the different phase errors being caused at least by phase noise at a transmitter and at a local oscillator at the communication channel.

7. The apparatus of claim 5 wherein the equalizer is one of a linear equalizer, a decision-feedback equalizer, a Maximum Likelihood Sequence Estimator (MLSE) equalizer, and a combination of linear, decision-feedback, and MLSE equalizers.

8. The apparatus of claim 7 wherein the MLSE equalizer compensates linear and nonlinear distortions in the communication channel.

9. The apparatus of claim 7 wherein the MLSE equalizer compensates for non-gaussian noise.

10. The apparatus of claim 5 wherein the equalizer produces soft outputs being used in soft channel decoding.

11. The apparatus of claim 5 wherein the equalizer iteratively produces outputs using a priori information provided by a channel decoder.

12. A method comprising:
equalizing a multidimensional signal transmitted over a communication channel and having a dimensionality of four or higher using an equalizer that is adaptively decision directed trained, equalizing comprising jointly rotating phase and polarization using a phase and polarization rotator;
wherein equalizing comprises producing soft outputs being used in soft channel decoding, and iteratively producing outputs using a priori information provided by a channel decoder.

13. The method of claim 12 wherein the equalizer is one of a linear equalizer, a decision-feedback equalizer, a Maximum Likelihood Sequence Estimator (MLSE) equalizer, and a combination of linear, decision-feedback, and MLSE equalizers.

14. The method of claim 12 further comprising:
estimating a phase angle vector using a phase estimator; and
estimating a polarization angle using a polarization angle estimator.

15. The method of claim 12 wherein the phase angle vector and the polarization angle are used to compensate different phase errors for each polarization, the different phase errors being caused at least by phase noise at a transmitter and at a local oscillator at the communication channel.

16. The method of claim 13 wherein equalizing comprises compensating linear and nonlinear distortions in the communication channel using the MLSE equalizer.

17. The method of claim 13 wherein equalizing comprises compensating for non-gaussian noise using the MLSE equalizer.

18. A system comprising:
a converter to produce an electrical signal vector representing at least one of amplitude, phase, and polarization information of a modulated carrier transmitted through a communication channel with impairments; and
a signal processor coupled to the converter to process the electrical signal vector to compensate the impairments of the communication channel, the signal processor comprising
an equalizer to equalize a multidimensional signal transmitted over the communication channel and having a dimensionality of four or higher, the equalizer being adaptively decision directed trained, the equalizer comprising a phase and polarization rotator to jointly rotate phase and polarization;
wherein the equalizer iteratively produces outputs using a priori information provided by a channel decoder.

19. The system of claim 18 wherein the equalizer is one of a linear equalizer, a decision-feedback equalizer, a Maximum Likelihood Sequence Estimator (MLSE) equalizer, and a combination of linear, decision-feedback, and MLSE equalizers.

20. The system of claim 18 wherein the equalizer produces soft outputs being used in soft channel decoding.

21. The system of claim 18 wherein the signal processor further comprises:
a phase estimator to estimate a phase angle vector; and
a polarization angle estimator to estimate a polarization angle.

22. The system of claim 21 wherein the phase angle vector and the polarization angle are used to compensate different phase errors for each polarization, the different phase errors being caused at least by phase noise at a transmitter and at a local oscillator at the communication channel.

23. The system of claim 19 wherein the MLSE equalizer compensates linear and nonlinear distortions in the communication channel.

24. The system of claim 19 wherein the MLSE equalizer compensates for non-gaussian noise.

* * * * *

UNITED STATES PATENT AND TRADEMARK OFFICE
CERTIFICATE OF CORRECTION

PATENT NO.       : 7,580,454 B2
APPLICATION NO.  : 10/891876
DATED            : August 25, 2009
INVENTOR(S)      : Carrer et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1323 days.

Signed and Sealed this

Fourteenth Day of September, 2010

David J. Kappos
*Director of the United States Patent and Trademark Office*